(12) United States Patent
Shiina et al.

(10) Patent No.: US 8,475,891 B2
(45) Date of Patent: Jul. 2, 2013

(54) EMBOSSED RELEASE PAPER AND PROCESS FOR PRODUCING THE SAME

(75) Inventors: Noriyuki Shiina, Yokohama (JP); Kyoko Kogo, Kita-Ku (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 307 days.

(21) Appl. No.: 12/681,126

(22) PCT Filed: Oct. 3, 2008

(86) PCT No.: PCT/JP2008/068066
§ 371 (c)(1),
(2), (4) Date: Apr. 1, 2010

(87) PCT Pub. No.: WO2009/044865
PCT Pub. Date: Apr. 9, 2009

(65) Prior Publication Data
US 2010/0215911 A1  Aug. 26, 2010

(30) Foreign Application Priority Data
Oct. 5, 2007  (JP) .................... 2007-261606

(51) Int. Cl.
| B41M 5/00 | (2006.01) |
| B32B 33/00 | (2006.01) |
| B32B 27/42 | (2006.01) |
| D06N 3/00 | (2006.01) |
| B31F 1/07 | (2006.01) |
| H01J 37/30 | (2006.01) |
| B29C 35/08 | (2006.01) |

(52) U.S. Cl.
USPC .............. 428/32.17; 428/32.81; 428/151; 428/502; 428/503; 428/901; 264/485; 264/494; 156/209; 156/275.5

(58) Field of Classification Search
USPC ................ 428/23.16, 32.17, 41.8, 156, 161, 428/172, 32.16, 32.81, 151, 502, 503, 904; 156/209, 275.5; 264/485, 494
See application file for complete search history.

(56) References Cited

U.S. PATENT DOCUMENTS
2007/0116929 A1  5/2007  Fujimori et al.
2009/0117330 A1  5/2009  Shiina et al.

FOREIGN PATENT DOCUMENTS
| EP | 1 146 166 A1 | 10/2001 |
| EP | 1992479 A1 * | 11/2008 |
| JP | 05-082806 A1 | 4/1993 |
| JP | 05-269931 A1 | 10/1993 |
| JP | 07-276569 A1 | 10/1995 |
| JP | 2002-283358 A1 | 10/2002 |
| JP | 2002-292641 A1 | 10/2002 |
| JP | 2002-361815 A1 | 12/2002 |
| JP | 2005-186516 A1 | 7/2005 |
| JP | 2007-023420 A1 | 2/2007 |
| WO | 2005/065937 A1 | 7/2005 |
| WO | 2007/091593 A1 | 8/2007 |

OTHER PUBLICATIONS

European Search Report dated Feb. 6, 2013.

* cited by examiner

Primary Examiner — Donald J Loney
(74) Attorney, Agent, or Firm — Burr & Brown

(57) ABSTRACT

This invention provides an embossed release paper that has high heat resistance and embossing properties. The embossed release paper comprises a paper base material, an ionizing radiation-cured resin layer, and a heat-cured silicone layer stacked in that order, the embossed release paper having embosses. The embossed release paper has high heat resistance and thus is suitable for use in synthetic leather production and melamine decorative sheet production that involve surface emboss pattern formation.

11 Claims, 4 Drawing Sheets

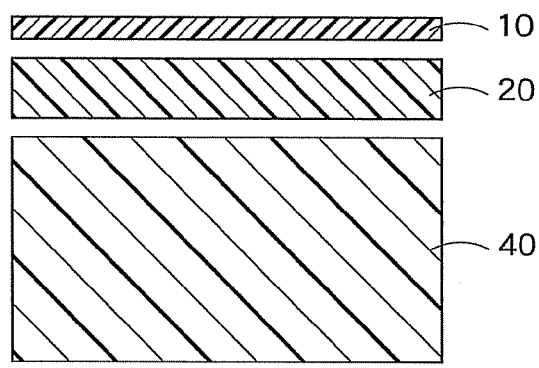
F I G. 1
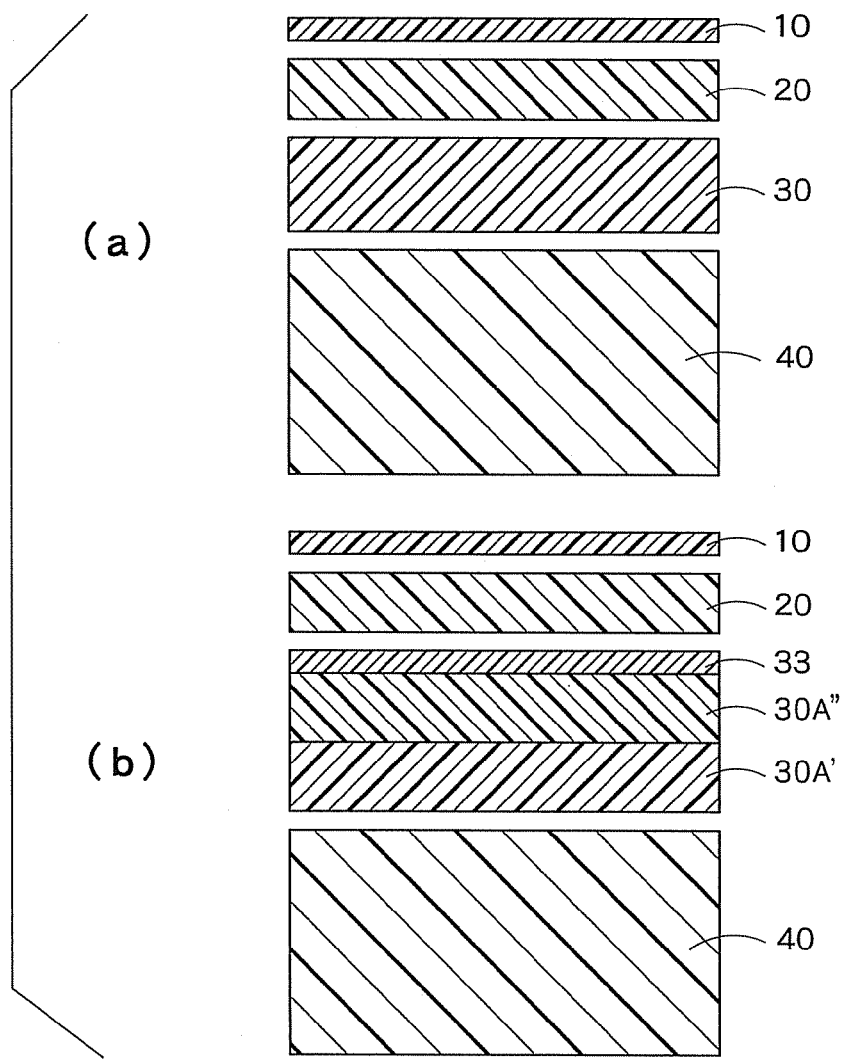
F I G. 2

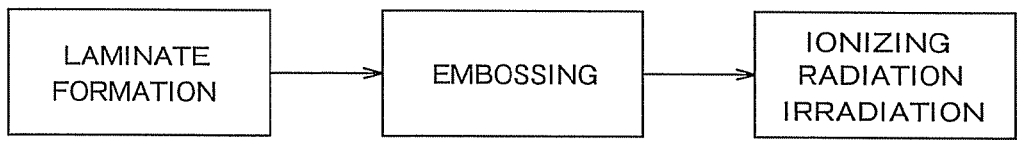
F I G. 3
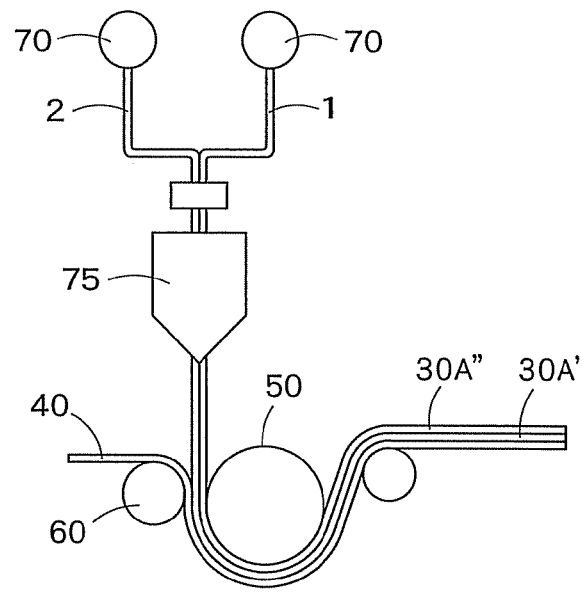
F I G. 4
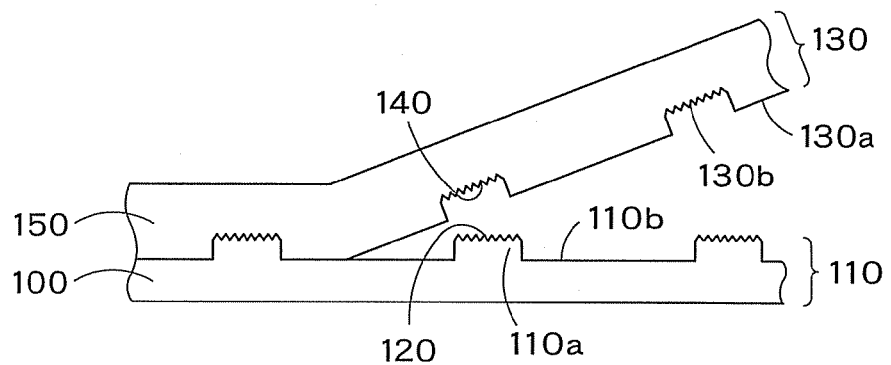
F I G. 5

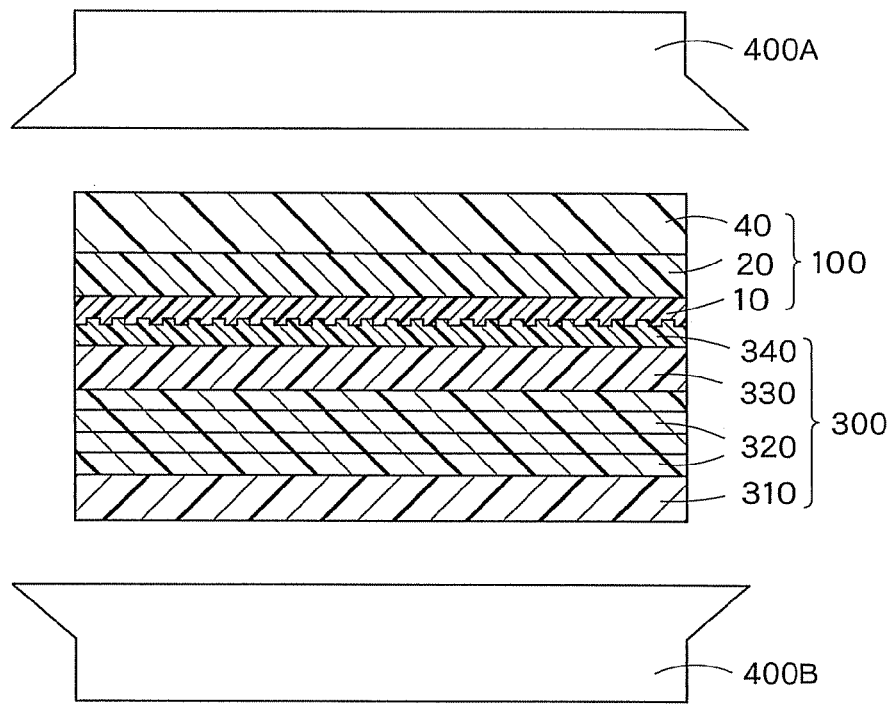
F I G. 9
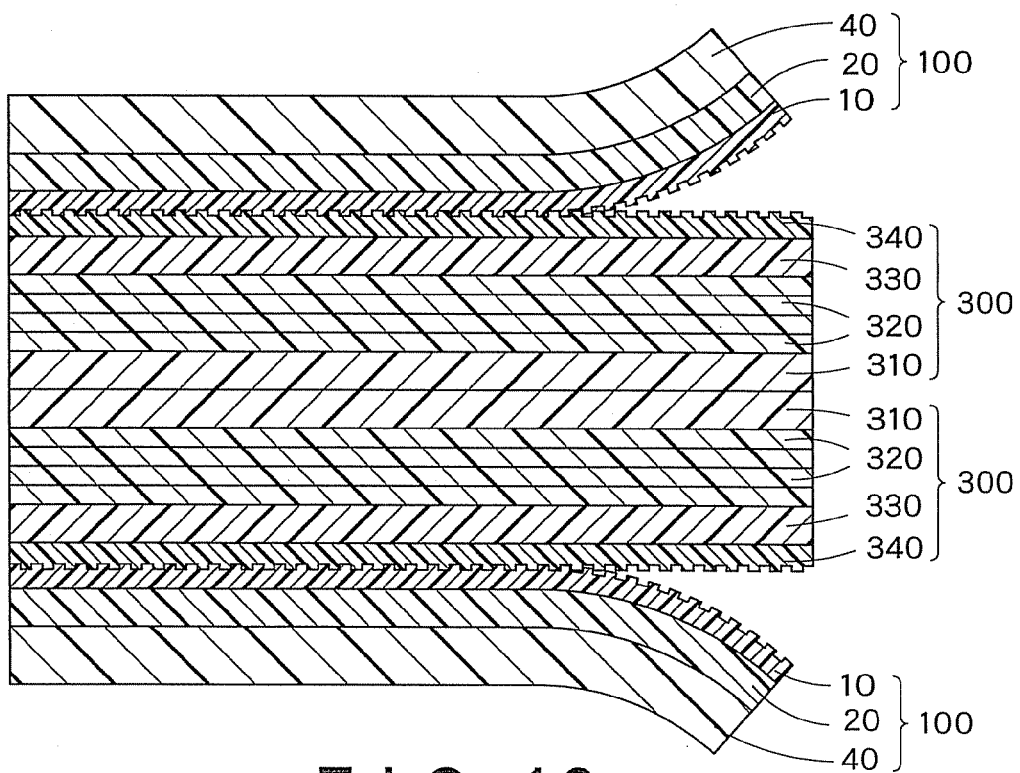
F I G. 10

EMBOSSED RELEASE PAPER AND PROCESS FOR PRODUCING THE SAME

BACKGROUND OF THE INVENTION

1. Field of the Invention

The present invention relates to an embossed release paper and more specifically relates to an embossed release paper that possesses high embossing properties, heat resistance, and solvent resistance and is suitable for use in the production of synthetic leathers and melamine decorative sheets.

2. Description of Related Art

Synthetic leathers using vinyl chloride resins or polyurethane resins as a main raw material have hitherto been widely used. In many cases, such synthetic leathers are produced using release papers. For example, a polyurethane leather is produced by coating a paste-like polyurethane resin onto a release paper, drying and solidifying the coating, then applying a backing fabric onto the solidified coating, and separating the assembly from the release paper. When the same crepey pattern or other concaves and convexes as in natural leathers is formed on the release paper, a good pattern can be imparted to the surface of the synthetic leather. Based on the same principle, a method may also be adopted which comprises coating a paste-like polyurethane resin onto a release paper, drying and solidifying the coating, then forming a vinyl chloride foam layer, applying a backing fabric onto the vinyl chloride foam layer, and separating the assembly from the release paper. Further, regarding the production of a vinyl chloride leather, a method has also been proposed which comprises coating a vinyl chloride sol onto a release paper, heating the coating to allow the coating to gel, then forming a vinyl chloride foam layer, applying a backing fabric onto the vinyl chloride foam layer, and separating the assembly from the release paper.

The release paper for use in the production of the synthetic leather is generally formed by coating a peel layer formed of a resin onto a paper base material and then embossing a specific concave and convex pattern on the peel layer. The pattern formed on the surface of the release paper is transferred onto the synthetic leather to form a surface pattern on the synthetic leather. Accordingly, the release paper should have a surface state suitable for the formation of the concave and convex pattern. Among others, a lamination method is disclosed as a method for forming a resin surface layer having relatively low unevenness. The lamination method comprises coextruding a resin composition comprising polypropylene and polyethylene and a polypropylene homopolymer on a base material (Japanese Patent Application Laid-Open No. 82806/1993). In the laminate with polypropylene laminated thereon, due to extrusion at a temperature at which lamination is possible, unevenness of extrusion is large. Mixing a low density polyethylene for problem improvement purposes causes uneven gloss and a rough surface due to poor compatibility. To overcome this problem, the method is characterized in that a resin composition comprising polypropylene having a specific melt flow rate and polyethylene having a specific structure and a polypropylene homopolymer having a specific melt flow rate are coextruded on a base material to improve the surface state. The claimed advantage of Japanese Patent Application Laid-Open No. 82806/1993 is that, when the resin composition and the polypropylene homopolymer are coextruded so that the resin composition are located on the base material side, the use of the specific resin composition can eliminate the problem of uneven extrusion and, further, the use of the polypropylene homopolymer can realize an excellent surface state that is resistant to heat and is free from uneven gloss and surface roughening. In working examples, the surface state is evaluated in addition to laminatability such as uneven extrusion, and laminates having excellent surface gloss and smoothness are provided.

A polyurethane synthetic leather with a fabric as a base material laminated onto its backside is produced by coating a polyurethane resin onto a release paper, drying the coating, and then using a two-component polyurethane adhesive comprising a first liquid containing a component having an isocyanate group as a functional group and a second liquid of polyol on the polyurethane layer to laminate the fabric base material. The two-component adhesive has high adhesive strength and is extensively used for furniture such as sofas, goods that are used for a long period of time, for example, shoes, and goods that are used under severe conditions. In the above process, however, an isocyanate group having a high reactivity is transferred onto the release paper, and, in this case, the separability of the release paper for the process is deteriorated, sometimes leading to lowered productivity. An embossed release paper comprising paper and an ionizing radiation cured film has been proposed as a release paper that has good separability from the two-component polyurethane adhesive and has high heat resistance (Japanese Patent Application Laid-Open No. 186516/2005). In Japanese Patent Application Laid-Open No. 186516/2005, a film that is a reaction product among an isocyanate compound, an (meth) acrylic compound containing an (meth)acryloyl group and reactive with the isocyanate compound, and a compound not containing an (meth)acryloyl group and reactive with the isocyante group and has been formed by curing an ionizing radiation-curable composition having a softening point of 40° C. or above and containing an ionizing radiation-curable composition with an ionizing radiation is used as the cured film. In a working example, an embossed release paper having excellent embossing property, heat resistance, and separability with repeated use is produced by coating the ionizing radiation-curable composition twice onto a paper base material having a sealing layer to form an ionizing radiation-cured film.

Further, a shaping sheet for use in pressing of heat curable resin decorative sheets such as melamine sheets has been proposed as a sheet for forming a specific concave and convex pattern in an object to be shaped. Specifically, a shaping sheet characterized by forming a primer layer on a base material film (a PET film), forming a concave and convex shape formed of an ionizing radiation-curable resin layer on the primer layer, and providing a coating layer, formed of a three-dimensionally crosslinked cured resin and capable of preventing bleeding of a bleeding component(s), on the other side of the base material film has been proposed (Japanese Patent Application Laid-Open No. 276569/1995). The heat curable resin decorative sheet is generally pressed under high temperature and high pressure conditions of a heating temperature of 100 to 150° C., a pressure of 5 to 100 Kg/cm$^2$, and a heating/pressing time of 5 to 30 min. Accordingly, the shaping sheet has been proposed in view of the fact that, in the shaping sheet using PET or the like as the base material film, flowable low-molecular weight components such as an oligomer and a plasticizer contained in PET are bled, contaminate a metal plate in the press, and make it impossible to reutilize the shaping sheet. The claimed advantage of the shaping sheet having the above constitution is that contamination by bleeding can be avoided by stacking of the coating layer that can block the bleeding component.

SUMMARY OF THE INVENTION

Regarding synthetic leathers produced using a release paper, not only matte-type synthetic leathers having a matte surface but also gloss-type synthetic leathers which are highly smooth and are glossy are produced according to applications and customers' favorites. In the laminate with polypropylene laminated thereonto as described in Japanese Patent Application Laid-Open No. 82806/1993 described above, because of thermoplasticity of polypropylene, an excellent embossing property can be realized in the embossing, and the contrast of the emboss is so high that a gloss feeling can easily be realized. On the other hand, due to the thermoplasticity of polypropylene, the heat resistance is unsatisfactory. For this reason, when the release paper is repeatedly used, the emboss is sometimes melted by heat during drying of the synthetic leather resin and, consequently, the possible number of times of repetition is limited. Accordingly, a release paper having high heat resistance and embossing property and, at the same time, having high mechanical strength has been desired.

The release paper described in Japanese Patent Application Laid-Open No. 186516/2005 comprises an ionizing radiation-cured film and thus has high mechanical strength. The ionizing radiation-cured film is formed by stacking two layers of the ionizing radiation-curable composition on top of each other. The ionizing radiation-curable composition is highly expensive. When the amount of the ionizing radiation-curable composition used is reduced, the thickness of the resin layer is reduced and, hence, deep embossing is impossible, making it difficult to ensure a deep crepey feeling. Accordingly, producing a release paper using an inexpensive compound while ensuring embossability is advantageous. In particular, the release paper is passed through a winding step in the production thereof, and, thus, preferably, the release paper is low adhesive and has high solvent resistance.

On the other hand, when the release paper is produced by embossing, the concaves in the release paper can easily be formed with high accuracy. Since, however, the pressure for embossing is relatively low, the formation of convexes with high accuracy is difficult. Accordingly, the contrast (light-dark difference) of the synthetic leather produced using the release paper is sometimes unsatisfactory. In particular, as in Japanese Patent Application Laid-Open No. 186516/2005, when a paper base material previously subjected to sealing treatment, for example, with a silica-containing acrylic resin for the purpose of preventing the penetration of a release agent into the paper base material is used, the contrast of the emboss is sometimes lowered, for example, by the silica used for the sealing treatment. Therefore, the development of a release paper which has high contrast regardless of whether or not the sealing layer is provided is desired.

Further, the release paper can be used in the production of the synthetic leather, as well as in the formation of a specific concave and convex pattern on a surface of a melamine decorative sheet. The release paper should also have high heat resistance and pressure resistance because the melamine decorative sheet is produced, for example, by superimposing a backing paper, a melamine resin-impregnated core paper, a melamine resin-impregnated decorative paper, and a melamine resin-impregnated overlay paper in that order, stacking the release paper on the overlay paper, and pressing the assembly under high temperature and high pressure conditions. The shaping sheet described in Japanese Patent Application Laid-Open No. 276569/1995 can suppress bleeding well. Since, however, the base material film is formed of PET, the upper limit of the heating temperature and the pressure is determined by the melting temperature of PET.

In addition, preferably, the release paper can be repeatedly utilized. To attain this, the release paper should easily be separated even when the release paper is used in the production of a synthetic leather using a two-component polyurethane adhesive or in the production of a melamine decorative sheet. For example, in the production of the melamine decorative sheet, a melamine resin which has leached from the overlay paper and the melamine resin-impregnated decorative paper is cured by pressing to form a melamine resin layer. Accordingly, the release paper should have high separability from the melamine resin layer, and, thus, the development of a release paper that has mechanical strength high enough to withstand repeated use and high separability has been desired.

Under these circumstances, an object of the present invention is to provide a release paper that can realize the use of a two-component adhesive in a synthetic leather production process, can also repeatedly produce a synthetic leather formed of a resin composition having a high melting point such as a vinyl chloride leather, and has high heat resistance, mechanical strength, and embossing properties.

Another object of the present invention is to provide an embossed release paper that can also be used in the formation of a specific concave and convex pattern on a surface of, for example, a melamine decorative sheet to which high temperature and high pressure conditions are applied and has high heat resistance, mechanical strength, and embossing properties.

A further object of the present invention is to provide a release paper that has a high contrast regardless of whether or not a sealing layer is provided.

The present inventors have made detailed studies on the construction of an embossed release paper and, as a result, have found that an embossed release paper having high solvent resistance, embossing properties, and releasability can be produced in a cost-effective and simple manner, because an ionizing radiation-cured resin layer formed by curing an ionizing radiation-curable composition formed of an (meth) acryloyl group-containing acrylic copolymer by an ionizing radiation has high solvent resistance and is free from tackiness, and the (meth)acryloyl group-containing acrylic copolymer can be produced at low cost; that, when a layer formed of a thermoplastic resin such as a polyolefin resin is stacked as an intermediate layer on a paper base material, the layer has high adhesion to the paper base material and, by virtue of its thermoplasticity, has high embossability, can realize high contrast in the emboss formation, and thus can render the release paper suitable for use as a gloss-type release paper; that, when a heat-cured silicone layer is stacked onto an ionizing radiation-cured resin, separability can be ensured even when a highly reactive adhesive such as a two-component polyurethane adhesive is used; that the provision of a sealing layer instead of the thermoplastic resin can prevent the penetration of a coating material used in the ionizing radiation-cured film and can improve the adhesion to the coating material to impart smoothness; and that the embossed release paper is also suitable for use as a shaping sheet in the formation of a concave and convex pattern on a surface of a melamine decorative sheet, which has led to the completion of the present invention.

The embossed release paper according to the present invention comprises an ionizing radiation-cured resin layer formed of an (meth)acryloyl group-containing acrylic copolymer. Accordingly, the embossed release paper has high solvent resistance, embossing properties, and releasability, can be reused a plurality of times, and thus is cost-effective.

The shaping layer for embossing comprises a thermoplastic resin layer and an ionizing radiation-cured resin layer. Accordingly, the thickness of the layer can be ensured, and, thus, a deep crepey feeling can be realized. Further, high embossing properties can be ensured by the thermoplastic resin layer such as polyolefin resin.

Further, in the embossed release paper according to the present invention, the solvent resistance can be ensured by forming a sealing layer as an intermediate layer between the paper base material and the ionizing radiation-cured resin layer.

BRIEF DESCRIPTION OF DRAWINGS

FIG. 1 is a diagram for explaining a laminate construction of an embossed release paper according to the present invention that comprises a paper base material, an ionizing radiation-cured resin layer, and a heat-cured silicone layer stacked on top of one another.

FIG. 2 (*a*) is a diagram for explaining a laminate construction of an embossed release paper wherein a sealing layer is further provided between the paper base material and the ionizing radiation-cured resin layer, and FIG. 2 (*b*) a diagram for explaining a laminate construction of an embossed release paper according to the present invention wherein the sealing layer is a thermoplastic resin layer and comprises a first polyolefin resin layer (30'), a second polyolefin resin layer (30"), and a surface treated layer (33).

FIG. 3 is a diagram showing a production process of an embossed release paper according to the present invention.

FIG. 4 is a diagram showing a part of a production process of an unembossed laminate used in the present invention.

FIG. 5 is a cross-sectional view showing one embodiment of an embossed release paper according to the present invention.

FIG. 9 is a diagram for explaining a production process of a melamine decorative sheet.

FIG. 10 is a diagram for explaining a production process of a melamine decorative sheet by a multiplaten press.

DESCRIPTION OF REFERENCE CHARACTERS

Figure 6:
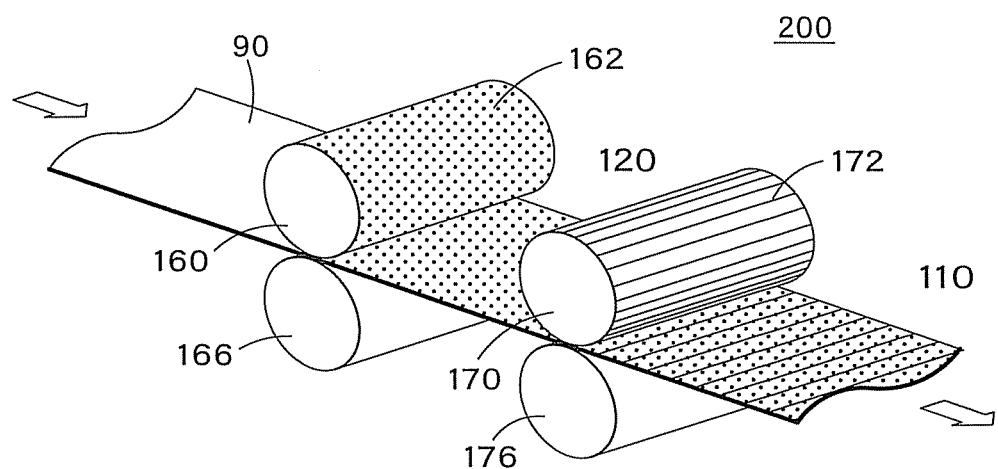
FIG. 6 is a perspective view showing one embodiment of an embossing device according to the present invention.

1 . . . polypropylene resin,
2 . . . composition resin composed of polypropylene resin and polyethylene resin,
10 . . . heat-cured silicone layer,
20 . . . ionizing radiation-cured resin layer,
30 . . . seal layer,
30A' . . . first polyolefin resin layer,
30A" . . . second polyolefin resin layer,
33 . . . surface treated layer,
40 . . . paper base material,
50 . . . cooling roll,
60 . . . backup roll,
70 . . . extruder A,
70' . . . extruder B,
75 . . . T die,
90 . . . original release paper,
100 . . . release paper,
110 . . . second concave and convex shape,
120 . . . first concave and convex shape,
130 . . . pattern of molded product,
140 . . . fine concave and convex shape in pattern of molded product (matted surface),
150 . . . molded product,
160 . . . first emboss roll,
170 . . . second emboss roll,
200 . . . embossing device,
300 . . . melamine decorative sheet, and
400A, 400B . . . planished metal plate

DETAILED DESCRIPTION OF THE INVENTION

According to a first aspect of the present invention, there is provided an embossed release paper comprising a paper base material, an ionizing radiation-cured resin layer, and a heat-cured silicone layer stacked in that order, the embossed release paper having been embossed. An intermediate layer such as a thermoplastic resin layer or a sealing layer may be provided between the paper base material and the ionizing radiation-cured resin layer. The present invention will be described in detail with reference to FIG. 1 showing one preferred embodiment of the present invention.

(1) Embossed Release Paper

As shown in FIG. 1, the embossed release paper according to the present invention comprises a heat-cured silicone layer (10), an ionizing radiation-cured resin layer (20), a thermoplastic resin layer (30), and a paper base material (40) provided in that order, the embossed release paper having being embossed. As shown in FIG. 2 (*a*), an intermediate layer (30) may be formed between the paper base material (40) and the ionizing radiation-cured resin layer (20). The intermediate layer (30) may have a single-layer structure or a multilayered structure comprising a plurality of layers. The multilayered structure may have a surface treated layer (33) formed by surface-treating the thermoplastic resin layer or the sealing layer, and the formation of the surface treated layer (33) can improve contact with the ionizing radiation-cured resin layer (20).

Specifically, when the embossed release paper according to the present invention comprises an intermediate layer (30) formed of a thermoplastic resin layer between the paper base material (40) and the ionizing radiation-cured resin layer (20), the embossed release paper may have a structure in which the thermoplastic resin layer has a structure of two or more layers, for example, a first polyolefin resin layer (30A") formed of a polypropylene resin and a second polyolefin resin layer (30A') formed of a composition comprising a polypropylene resin and a polyethylene resin, the second polyolefin resin layer (30A') is provided on the paper base material (40), and the first polyolefin resin layer (30A"), the surface treated layer (33), the ionizing radiation-cured resin layer (20), and the heat-cured silicone (10) are stacked in that order on the second polyolefin resin layer (30A'). This construction can improve the adhesion between the paper base material (40) and the thermoplastic resin layer (30).

The ionizing radiation-cured resin layer (20) constituting the embossed release paper according to the present invention may also have a single-layer structure or a multilayered structure of two or more (not shown). For example, a construction may also be adopted in which an ionizing radiation-cured resin layer (20A) containing an inorganic pigment and an ionizing radiation-cured resin layer (20B) free from an inorganic pigment are stacked on the ionizing radiation-cured resin layer. When the ionizing radiation-cured resin layer (20A) is stacked onto the paper base material followed by stacking of the ionizing radiation-cured resin layer (20B), the sealing effect can also be ensured without providing the intermediate layer (30).

(2) Paper Base Material

The paper base material according to the present invention should have strength high enough to withstand the step of stacking the intermediate layer (30), the ionizing radiation-cured resin layer (20), and the heat-cured silicone layer (10), should have heat resistance, chemical resistance or other properties as a release paper in the formation of a synthetic leather by coating or in shaping a concave and convex pattern on a surface of a melamine decorative sheet, and should easily be embossed. Noncoated papers such as kraft paper, wood free paper, machine glazed kraft paper, pure white machine glazed paper, glassine paper, and cup base paper, and, further, synthetic papers not using natural pulp may be used. The paper formed of a natural pulp having high durability and heat resistance is preferred from the viewpoint of the processing suitability of synthetic leathers and melamine decorative sheet.

In the present invention, paper used as the base material layer has a basis weight of 15 to 300 g/m$^2$, preferably 100 to 180 g/m$^2$. When the basis weight falls within this range, embossing is easy. The paper is preferably neutralized paper. Acidic paper containing aluminum sulfate and the like is deteriorated by heat when the paper is repeatedly used in a production process of the synthetic leather or the melamine decorative sheet. For this reason, in some cases, reuse of the paper becomes impossible in an early stage. The neutralized paper can prevent the heat deterioration.

In the paper used in the present invention, a neutral rosin, an alkyl ketene dimer, or an alkenyl succinic anhydride may be used as a sizing agent, and, for example, a cationic polyacrylamide or a cationic starch may be used as a fixing agent. For the above reason, most preferably, aluminum sulfate is not used. However, papermaking in a neutral region of pH 6 to 9 using aluminum sulfate is also possible. If necessary, in addition to the above sizing agents and fixing agents, other additives such as various fillers for papermaking, yield improvers, dry paper strength agents, wet paper strength agents, binders, dispersants, coagulants, plasticizers, and adhesives may be properly contained.

Further, conventional commercially available products with a sealing layer or a resin layer, which will be described later, previously formed thereon, for example, ultra lightweight coat papers, coated printing papers, resin-coated papers, converting papers, release base papers, and double coated peel-off base papers, may also be used as the paper base material according to the present invention.

(3) Thermoplastic Resin Layer

The intermediate layer according to the present invention is a layer provided between the paper base material and the ionizing radiation-cured resin layer to ensure heat resistance, shaping properties, separability, solvent resistance, and sealing effect and is a thermoplastic resin layer or a sealing layer.

In the present invention, the thermoplastic resin constituting the thermoplastic resin layer can be properly selected according to the type of an object to be shaped and production conditions. Examples of such thermoplastic resins include, in addition to acrylic resins, polyolefin resins such as polyethylene, polypropylene, and polymethylpentene, and other resins, for example, silicone resins and alkyd resins including aminoalkyd resins. Among others, polypropylene resins are preferred from the viewpoint of high heat resistance. The polypropylene resin used in the present invention may be a propylene homopolymer or a copolymer of propylene as a main component, for example, with an α-olefin such as ethylene, butene, pentene, hexene, octene, or 4-polymethylpentene-1, as long as heat resistance as an embossed release paper is not sacrificed.

In the case of vinyl chloride resins or the like, from which synthetic leathers are produced through a heat treatment step at a temperature above 180° C., or from which, for example, melamine decorative sheets are produced under high temperature and high pressure conditions, the use of polymethylpentene resins is preferred as the intermediate layer. For example, when a synthetic leather is produced from a vinyl chloride resin, a vinyl chloride resin is sometimes foamed and stacked. In this case, the drying temperature is 180 to 210° C. Accordingly, the resistance to such high temperatures is required, and, in this case, the use of a polymethylpentene resin having a higher melting point is preferred. The polymethylpentene resin used in the present invention may be a homopolymer of 4-methyl-1-pentene or a copolymer of 4-methyl-1-pentene as a main component with other α-olefin, for example, an α-olefin having 2 to 20 carbon atoms such as ethylene, propylene, 1-butene, 1-hexene, 1-octene, 1-decene, 1-tetradecene, or 1-octadecene. For example, a copolymer that is composed mainly of 4-methyl-1-pentene, i.e., 97 to 98% by mass of 4-methyl-1-pentene and 2 to 3% by mass of an α-olefin, and has a melting point of 236 to 238° C. as measured by differential scanning calorimetry (DSC method) and a melt flow rate (MFR) of 160 to 200 g/10 min as measured according to ASTM D1238 under conditions of a load of 2.16 kg and a temperature of 260° C., is suitable. The polymethylpentene resin has high heat resistance to heat treatment temperature in a production process using a vinyl chloride resin as a raw material for the production of a synthetic leather and heating conditions in the production of a melamine decorative sheet and can easily be separated after the polymethylpentene resin is embossed.

In the present invention, the thermoplastic resin layer may have a single-layer structure. The thermoplastic resin layer is not limited to the single-layer structure, and, as shown in FIG. 2 (*b*), may have a multilayered structure including a first polyolefin resin layer (30A") selected from polypropylene resins and polymethylpentene resins and a second polyolefin resin layer (30A') formed of a composition comprising the resin constituting the first polyolefin resin layer and a polyethylene resin. The number of layers constituting the multilayered structure is not limited to two and may be three or more.

In the composition that constitutes the second polyolefin resin and comprises the resin constituting the first polyolefin resin layer and the polyethylene resin, the amount of the polyethylene resin incorporated is 5 to 80% by mass, more preferably 10 to 50% by mass. Polyethylene has a melting point below the polypropylene resin and polymethylpentene resin. However, when the amount of the polyethylene resin falls within the above-defined range, the first polyolefin resin layer (30A") and the paper base material (40) can be bonded to each other well and, at the same time, heat resistance high enough to withstand the production of synthetic leathers and melamine decorative sheets can be ensured.

In this case, the polyethylene resin used is not particularly limited, and any of low density polyethylene, medium density polyethylene, and high density polyethylene is possible. Since, however, the melting point varies depending upon the density, preferably, the polyethylene resin has a melting point of 90 to 130° C., more preferably 110 to 120° C. When the melting point is in the above-defined range, the heat resistance as the embossed release paper can be ensured.

The thermoplastic resin layer can be formed by stacking the polyolefin resin or composition resin onto a paper base material, for example, by roll coating, gravure coating, extrusion coating, knife coating, Mayer bar coating, and dip coating.

The thickness of a thermoplastic resin layer (30A) is preferably 3 to 40 µm, more preferably 5 to 20 µm. When the thickness of the thermoplastic resin layer (30A) is smaller than 3 µm, the separability of the embossed release paper after the production of synthetic leathers or melamine decorative sheets is sometimes deteriorated. On the other hand, when the thickness of the thermoplastic resin layer (30A) exceeds 40 µm, the level of curing of the release paper is sometimes increased.

When the thermoplastic resin layer (30A) has a multilayered structure, for example, when the thermoplastic resin layer (30A) includes, for example, a first polyolefin resin layer (30A") and a second polyolefin resin layer (30A'), the thermoplastic resin layer (30A) may be stacked onto the paper base material, for example, by coextrusion.

In the present invention, the thermoplastic resin layer (30A) may have a surface treated layer. The adhesion to the ionizing radiation-cured resin layer can be improved by the surface treatment. Examples of the surface treatment include pretreatment such as frame treatment, corona discharge treatment, ozone treatment, low-temperature plasma treatment using an oxygen gas, a nitrogen gas or the like, glow discharge treatment, or oxidation treatment using chemicals or the like. For example, a primer coating agent, an undercoating agent, an anchor coating agent, an adhesive, or a vapor deposition anchor coating agent may also be previously coated for the surface treatment. The coating agent may be a resin composition that contains, as a main component of a vehicle, for example, a polyester resin, a polyamide resin, a polyurethane resin, an epoxy resin, a phenol resin, an (meth)acrylic resin, a polyvinyl acetate resin, a polyolefin resin, such as a polyethylene or a polypropylene, or its copolymer or modification product, or a cellulose resin.

Among the surface treatment methods, corona treatment or plasma treatment is particularly suitable. The plasma treatment may be carried out, for example, by surface modification using a plasma gas produced by ionizing gas by arc discharge. The plasma gas may be, for example, an inorganic gas such as oxygen gas, nitrogen gas, argon gas, or helium gas in addition to the above gas. That is, in-line plasma treatment immediately before the formation of a vapor deposited film of an inorganic oxide by physical vapor-phase growth or chemical vapor-phase growth which will be described later can remove moisture, dust and the like present on the surface of the base material film and, at the same time, can realize smoothing and activation of the surface and other surface treatment. Further, in the present invention, the plasma treatment is preferably plasma discharge treatment by taking into consideration the output of plasma, the type of plasma gas, the supply amount of the plasma gas, treatment time, and other conditions. The plasma may be generated with a direct-current glow discharge, high-frequency discharge, microwave discharge, or other apparatus. The plasma treatment may also be carried out by atmospheric plasma treatment.

(4) Sealing Layer

The sealing layer used as the intermediate layer in the present invention comprises a film forming resin and 0.5 to 50% by mass, based on the resin, of an inorganic pigment. Film forming resins suitable herein include polyvinyl alcohols, acrylic resins, styrene-acryl resins, cellulose derivatives, polyester resins, polyurethane resins, melamine resins, alkyd resins, aminoalkyd resins, polyvinyl chloride resins, polyvinylidene chloride resins, synthetic latexes, natural rubbers, polybutadiene, styrene-butadiene polymer, acrylonitrile-butadiene polymer, methyl methacrylate-butadiene polymer, 2-vinylpyridine-styrene-butadiene polymer, polychloroprene, polyisoprene, polystyrene, polyurethane, acrylate polymer, polyvinyl acetate, vinyl acetate copolymer, vinyl acetate-ethylene copolymer, acrylate-styrene polymer, polyethylene, vinyl chloride polymer, vinylidene chloride polymer, and epoxy-containing resins. These may be used solely or as a mixture of two or more.

Suitable inorganic pigments usable herein include talc, kaolin, silica, calcium carbonate, barium sulfate, titanium oxide, and zinc oxide and are incorporated in an amount of 0.5 to 70% by mass in the film forming resin. When the amount of the inorganic pigment incorporated is less than 0.5% by mass, the sealing effect is sometimes lowered. On the other hand, when the amount of the inorganic pigment incorporated exceeds 70% by mass, the emboss shaping properties are sometimes inhibited. Preferably, a coverage of 0.5 to 20 g/m$^2$ suffices for the sealing layer. The sealing material can be coated in the same manner as in the thermoplastic resin layer. The coating material is generally diluted with 10 to 1000 parts by mass, based on 100 parts by mass of the solid matter, of a solvent to prepare a coating solution, and the coating solution is then coated. The dilution with the solvent can impart a viscosity, for example, 10 to 3000 mPa·sec at 25° C. suitable for coating.

(5) Ionizing Radiation-Cured Resin Layer

The ionizing radiation-cured resin layer used in the present invention is formed by curing an ionizing radiation-curable composition formed of an (meth)acryloyl group-containing acrylic copolymer (I) or an ionizing radiation-curable composition formed of an (meth)acryloyl group-containing acrylic copolymer (II) produced by reacting a copolymer comprising 35 to 80 parts by mass of an (meth)acrylic ester, 20 to 60 parts by mass of a glycidyl(meth)acrylic ester, and 0 to 30 parts by mass of other (meth)acrylic ester with 10 to 30 parts by mass of (meth)acrylic acid by ionizing radiation irradiation. The weight average molecular weight (Mw) of the (meth)acryloyl group-containing acrylic copolymer (I) is 5,000 to 200,000, more preferably 15,000 to 100,000, particularly preferably 15,000 to 70,000. The (meth)acryloyl group-containing acrylic copolymer (I) has a variance ratio (Mw/Mn) of 1.0 to 5.0, more preferably 1.5 to 4.0, particularly preferably 1.9 to 3.5, and a glass transition temperature (Tg) of 40 to 150° C., more preferably 65 to 120° C., particularly preferably 65 to 90° C. In the present invention, the weight average molecular weight and the number average molecular weight are values determined in terms of polystyrene by gel permeation chromatography (GPC). The ionizing radiation-cured resin layer in the embossed release paper should maintain the emboss structure in embossing in the production of a synthetic leather or a melamine decorative sheet. In general, embossing is carried out at a temperature of 40 to 150° C. According to the present invention, it was found that the ionizing radiation-curable composition formed of the (meth)acryloyl group-containing acrylic copolymer has high solvent resistance, is not excessively softened in embossing and has high embossing properties, and, at the same time, is tack-free in the formation of the ionizing radiation-cured resin layer and, thus, can realize easy winding of the original sheet and thus has very good operability.

The (meth)acryloyl group-containing acrylic copolymer (I) can be produced, for example, by reacting an epoxy group-containing copolymer (C) comprising (meth)acrylate monomer units (A) and epoxy group-containing (meth)acrylate monomer units (B) with (meth)acrylic acid.

In the present invention, (meth)acrylate monomer units (A) include methyl methacrylate, methyl acrylate, butyl acrylate, butyl methacrylate, isobutyl acrylate, isobutyl methacrylate, hydroxyethyl acrylate, hydroxyethyl methacrylate, dicyclopentanyl acrylate, dicyclopentanyl methacrylate, 2-(dicyclopentanyloxy)ethyl acrylate, 2-(dicyclopentanyloxy)ethyl methacrylate, 2-(dicyclopentanyloxy)ethyl-2'-(acryloyloxy) ethylether, 2-(dicyclopentanyloxy)ethyl-2'-(methacryloyloxy)ethylether, 2-{2-(dicyclopentanyloxy)ethyloxy}-1-{2'-(acryloyloxy)ethyloxy}ethane, 2-{2-(dicyclopentanyloxy) ethyloxy}-1-{2'-(methacryloyloxy)ethyloxy}ethane, dicyclopentenyl acrylate, dicyclopentenyl methacrylate, 2-(dicyclopentenyloxy)ethyl acrylate, 2-(dicyclopentenyloxy)ethyl methacrylate, 2-(dicyclopentenyloxy)ethyl-2'-(acryloyloxy)ethylether, 2-(dicyclopentenyloxy)ethyl-2'-(methacryloyloxy)ethylether, 2-{2-(dicyclopentenyloxy)ethyloxy}-1-{2'-(acryloyloxy)ethyloxy}ethane, 2-{2-(dicyclopentenyloxy)ethyloxy}-1-{2'-(methacryloyloxy)ethyloxy}ethane, dimethylol-tricyclodecane diacrylate, dimethylol-tricyclodecane dimethacrylate, isobornyl acrylate, isobornyl methacrylate, cyclohexyl acrylate, and cyclohexyl methacrylate. Among them, methylmethacrylate, methylacrylate, isobornyl methacrylate, isobornyl acrylate and the like are suitable.

Epoxy group-containing (meth)acrylate monomer units (B) include glycidyl methacrylate, methyl glycidyl methacrylate, 3,4-epoxycyclohexyl methyl methacrylate, 3,4-epoxycyclohexyl methyl acrylate, and aziridinyl(meth)acrylate.

The mixing ratio between the (meth)acrylate monomer units (A) and the epoxy group-containing (meth)acrylate monomer units (B) is that the epoxy group-containing (meth) acrylate monomer units (B) are incorporated in an amount of 5 to 95% by mass based on the total mass of the monomer units. When the content of the epoxy group-containing (meth) acrylate monomer units (B) is less than 5% by mass, a satisfactory double bond equivalent cannot be ensured. In this case, the solvent resistance and the scratch resistance after curing of the (meth)acryloyl group-containing acrylic copolymer (I) are sometimes deteriorated. On the other hand, when the content of the epoxy group-containing (meth)acrylate monomer units (B) exceeds 95% by mass, the Tg value is so low that the uncured film is tacky and the shaping properties are sometimes deteriorated.

Further, the ionizing radiation-curable composition used in the present invention may be an (meth)acryloyl group-containing acrylic copolymer (II) produced by reacting a copolymer comprising 35 to 80 parts by mass of an (meth)acrylic ester, 20 to 60 parts by mass of a glycidyl(meth)acrylic ester, and 0 to 30 parts by mass of other (meth)acrylic ester, with 10 to 30 parts by mass of (meth)acrylic acid. The (meth)acrylic ester and other (meth)acrylic ester correspond to the (meth) acrylate monomer units (A), and the glycidyl(meth)acrylic ester corresponds to the epoxy group-containing (meth)acrylate monomer units (B). Accordingly, other (meth)acrylic esters can be properly selected from the above (meth)acrylate monomer units (A).

The copolymer is produced by copolymerizing the monomer units in the presence of a radical initiator. The radical initiator is not particularly limited, and examples thereof include conventional radical initiators, for example, azo compounds such as 2,2'-azobis(2,4-dimethylvaleronitrile), 2,2'-azobisisobutyronitrile, 2,2'-azobis(2-methylbutyronitrile), 1,1'-azobis-(cyclohexane-1-carbonitrile), azobis methylbutyronitrile, 2,2'-azobis-(4-methoxy-2,4-dimethylvaleronitrile), 2,2'-azobisisobutyronitrile, and dimethyl 2,2'-azobisisobutyrate; hydrogen peroxides; peroxides such as lauroyl peroxide, 2,4-dichlorobenzoyl peroxide, t-butylperoxypyvalate, 3,5,5-trimethylhexanoyl peroxide, octanoyl peroxide, decanoyl peroxide, lauroyl peroxide, succinic acid peroxide, acetyl peroxide, t-butylperoxy-2-ethylhexanoate, m-toluoyl peroxide, benzoyl peroxide, t-butylperoxy maleic acid, t-butylperoxy laurate, t-butylperoxy-3,5,5-trimethylhexanoate, cyclohexanone peroxide, t-butylperoxy isopropyl carbonate, 2,5-dimethyl-2,5-di(benzoylperoxy)hexane, 2,2-bis(t-butylperoxy)octane, t-butyl peroxyacetate, 2,2-bis(t-butylperoxy)butane, t-butyl peroxybenzoate, n-butyl-4,4-bis(t-butylperoxy)valerate, di-t-butyl-diperoxyisophthalate, methyl ethyl ketone peroxide, dicumyl peroxide, 2,5-dimethyl(t-butylperoxy)hexane, and t-butylcumyl peroxide; peroxides such as potassium persulfate, ammonium persulfate, and sodium hypochlorite, or redox initiators comprising a combination of the peroxide with a reducing agent. A suitable initiator is properly selected from the above initiators according to the polymerization method. The amount of the polymerization initiator used varies depending upon the type of the polymerization initiator and polymerization conditions but is generally 0.1 to 10 parts by mass based on 100 parts by mass of the monomers.

The polymerization temperature varies depending upon the type of the polymerization initiator but is generally 40 to 180° C., preferably 50 to 150° C., more preferably 60 to 130° C. The reaction may be carried out under the atmospheric pressure or under pressurized conditions. The pressure is generally 0.15 to 0.5 MP. The polymerization time is 3 to 15 hr.

The monomer units (A) and the monomer units (B) are polymerized by solution polymerization. Solvents usable in the solution polymerization include conventional solvents including organic solvents, for example, aliphatic hydrocarbon compounds such as n-hexane, heptane, and octane, alicyclic hydrocarbon compounds such as cyclohexane, methylcyclohexane, and ethylcyclohexane, aromatic hydrocarbon compounds such as benzene, toluene, xylene, and cumene, ether compounds such as tetrahydrofuran, di-n-butyl ether, ethylene glycol dimethyl ether, and ethylene glycol diethyl ether; alcohols such as methanol and ethanol; ketones such as acetone and methyl isobutyl ketone; ethylbenzene; methyl ethyl ketone; and butyl acetate. Among them, for example, methyl ethyl ketone, methanol, toluene, ethylbenzene, and butyl acetate are preferred. These solvents may be used solely or in a combination of two or more.

The concentration of the monomers in the reaction solvent is preferably 10 to 80% by mass. When the concentration of the monomers is lower than 10% by weight, the reaction rate is unsatisfactory. On the other hand, when the concentration of the monomers in the reaction solvent is higher than 80% by mass, a gelled product is likely to produce during the reaction.

In order to provide a satisfactory reaction rate, the reaction is preferably carried out in the presence of a catalyst. Catalysts usable herein include phosphines such as triphenylphosphine and tributylphosphine, amines such as triethylamine and dimethylbenzylamine, and sulfides such as dimethyl sulfide and diphenyl sulfide. Among them, phosphines are preferred from the viewpoint of a reaction rate. Triphenylphosphine is particularly preferred.

The amount of the catalyst is generally 0.1 to 10% by mass based on the epoxy group-containing (meth)acrylate monomer units (B). When the amount of the catalyst is less than 0.1% by weight based on the epoxy group-containing (meth) acrylate monomer units (B), the reaction rate is sometimes unsatisfactory. On the other hand, when the amount of the catalyst is larger than 10% by mass, various properties of the produced resin are adversely affected.

Additives usable for the prevention of a gelled product during the reaction include N-oxyradical compounds such as hydroquinone, hydroquinone monomethyl ether, phenothiazine, 4-hydroxy-2,2,6,6-tetramethyl piperidine-N-oxyl, 4-acetamino-2,2,6,6-tetramethylpiperidine-N-oxyl, 4-benzoxy-2,2,6,6-tetramethylpiperidine-N-oxyl, 4-oxo-2,2,6,6- tetramethylpiperidine-N-oxyl, and 2,2,6,6-tetramethylpiperidine-N-oxyl; phenol compounds such as hydroquinone, hydroquinone monomethyl ether, 2,6-di-t-butyl-4-methylphenol, 2,2'-methylenebis(4-ethyl-6-t-butylphenol), 2,6-di-t-butyl-N,N-dimethylamino-p-cresol, 2,4-dimethyl-6-t-butylphenol, 4-t-butylcatechol, 4,4'-thio-bis(3-methyl-6-t-butylphenol), and 4,4'-butylidene-bis(3-methyl-6-t-butylphenol); amine compounds such as phenothiazine, N,N'-diphenyl-p-phenylenediamine, phenyl-β-naphthylamine, N,N'-di-β-naphthyl-p-phenylenediamine, and N-phenyl-N'-isopropyl-p-phenylenediamine; hydroxylamine compounds such as 1,4-dihydroxy-2,2,6,6-tetramethylpiperidine and 4-dihydroxy-2,2,6,6-tetramethylpiperidine; quinone compounds such as benzoquinone and 2,5-di-t-butylhydroquinone; and copper compounds such as ferrous chloride and copper dimethyldithiocarbamate. These may be used solely or as a mixture of two or more. The amount of the polymerization inhibitor is preferably 1 to 10000 ppm based on the whole reaction solution.

The (meth)acryloyl group-containing acrylic copolymer (I) or (II) can be produced by reacting the copolymer (C) thus obtained with (meth)acrylic acid. A double bond can be introduced into the (meth)acryloyl group-containing acrylic copolymer by modifying the copolymer with (meth)acrylic acid, more preferably acrylic acid. The (meth)acryloyl group-containing acrylic copolymer (I) used in the present invention constitutes the ionizing radiation-cured film. From the viewpoint of ensuring solvent resistance and heat resistance by curing, the double bond equivalent is preferably 0.5 to 4.5, more preferably 0.5 to 4.0, particularly preferably 0.7 to 3.6. Accordingly, (meth)acrylic acid is preferably reacted with the copolymer (C) so that the double bond equivalent falls within the above-defined range.

The reaction of a copolymer (C) with (meth)acrylic acid is preferably carried out in a solution in the presence of a tertiary amine catalyst, a quaternary ammonium salt catalyst, a tertiary phosphine catalyst, a quaternary phosphine salt catalyst, or an organotin compound catalyst. Specifically, phosphines such as triphenylphosphine and tributylphosphine, amines such as triethylamine and dimethylbenzyl amine, or sulfides such as dimethyl sulfide and diphenyl sulfide are usable.

The reaction time and the reaction temperature vary depending upon the selected solvent and reaction pressure but are generally 50 to 160° C. and 3 to 50 hr, respectively, at a pressure of the atmospheric pressure to 0.2 MPa.

The ionizing radiation-curable composition according to the present invention comprises an (meth)acryloyl group-containing acrylic copolymer (I) having a weight average molecular weight (Mw) of 5,000 to 200,000, a variance ratio (Mw/Mn) of 1.0 to 5.0, and a glass transition temperature (Tg) of 40 to 150° C. When the Tg value of the (meth)acryloyl group-containing acrylic copolymer (I) is below 40° C., in some cases, the copolymer is melted during embossing resulting in poor embossing properties, or the uncured film becomes tacky resulting in poor sheet winding. On the other hand, when the Tg value of the (meth)acryloyl group-containing acrylic copolymer (I) is above 150° C., a very high temperature should be applied during emboss penetration and, further, the flexibility after curing is sometimes deteriorated. The Tg specified in the present invention is measured by a method described in working examples which will be described later. When the Tg value exceeds 150° C., shaping sometimes becomes difficult.

The weight average molecular weight (Mw) and the Tg value of the (meth)acryloyl group-containing acrylic copolymer (II) produced by reacting a copolymer comprising 35 to 80 parts by mass of an (meth)acrylic ester, 20 to 60 parts by mass of a glycidyl(meth)acrylic ester, and 0 to 30 parts by mass of other (meth)acrylic ester with 10 to 30 parts by mass of (meth)acrylic acid are not limited. When the (meth)acryloyl group-containing acrylic copolymer (II) is formed into the embossed release paper, the glass transition temperature is preferably 40 to 150° C., more preferably 65 to 120° C. Tg correlates with the weight average molecular weight (Mw) and the double bond equivalent. Accordingly, in order to meet the glass transition temperature, the double bond is incorporated, and the weight average molecular weight (Mw) is adjusted. The weight average molecular weight (Mw) is preferably 5,000 to 200,000, more preferably 15,000 to 100,000, particularly preferably 15,000 to 70,000. When the weight average molecular weight (Mw) is lower than 5,000, the solvent resistance and the toughness are sometimes poor. On the other hand, when the weight average molecular weight (Mw) is larger than 200,000, the viscosity of the resin is increased and, consequently, the polymer becomes sometimes difficult to handle. The glass transition temperature (Tg) is 40 to 150° C., more preferably 65 to 120° C., particularly preferably 65 to 90° C. When the glass transition temperature (Tg) falls within the above-defined range, after curing of the (meth)acryloyl group-containing acrylic copolymer (II), high solvent resistance and scratch resistance, freedom from tack of the uncured film, and high embossing properties can be realized.

The ionizing radiation-curable composition used in the present invention may consist of the (meth)acryloyl group-containing acrylic copolymer (I) or (II) alone. The term "composition" means a blend of two or more substances. As is apparent from the variance ratio of the (meth)acryloyl group-containing acrylic copolymer (I), however, since (meth)acryloyl group-containing acrylic copolymers different from each other in molecular weight are contained, in the present specification, a material consisting of the (meth)acryloyl group-containing acrylic copolymer alone is also called an ionizing radiation-curable composition. On the other hand, the ionizing radiation-curable composition used in the present invention may further contain other additives such as inorganic pigments and photopolymerization initiators. The incorporation of the inorganic pigment can impart matte feeling to the embossed release paper.

Examples of such inorganic pigments include talc, kaolin, silica, calcium carbonate, barium sulfate, titanium oxide, and zinc oxide. The amount of the inorganic pigment incorporated in the ionizing radiation-cured film is 0.5 to 50% by mass, more preferably 1 to 10% by mass. When the ionizing radiation-cured resin layer has a multilayered structure of two or more layers, the amount of the inorganic pigment incorporated in each of the layers falls within the above-defined range.

Photopolymerization initiators which can be incorporated in the ionizing radiation-curable composition include benzoin ethyl ether, acetophenone, diethoxyacetophenone, benzyl dimethyl ketal, 2-hydroxy-2-methylpropiophenone, 2-methyl-1-[4-(methylthio)phenyl]-2-morpholinopropane-1,1-hydroxycyclohexyl phenyl ketone, benzophenone, p-chlorobenzophenone, Michler's ketone, isoamyl N,N-dimethylaminobenzoate, 2-chlorothioxanthone, and 2,4-diethylthioxanthone. The amount of the photopolymerization initiator incorporated is 1 to 10 parts by mass based on 100 parts by mass of the (meth)acryloyl group-containing acrylic copolymer.

Further, in order to modify the curing properties of the (meth)acryloyl group-containing acrylic copolymer, for example, other resins, silicone compounds, reactive monomers, or other photocurable polymers may be incorporated as optional components, in the ionizing radiation-curable composition, in such an amount that do not sacrifice the properties of the (meth)acryloyl group-containing acrylic copolymer.

Other resins usable herein include methacrylic resins, chlorinated polypropylenes, epoxy resins, polyurethane resins, polyester resins, polyvinyl alcohols, and polyvinylacetals, and reactive monomers include methyl(meth)acrylate, ethyl(meth)acrylate, propyl(meth)acrylate, butyl(meth)acrylate, ethylhexyl(meth)acrylate, stearyl(meth)acrylate, lauryl (meth)acrylate, tridecyl(meth)acrylate, trimethylolpropane triacrylate, tris(acryloxyethyl)isocyanurate, pentaerythritol tetraacrylate, and di pentaerythritol hexaacrylate.

A polyfunctional (meth)acrylate oligomer may be mentioned as the photocurable polymer. The amount of the polyfunctional (meth)acrylate oligomer incorporated is not more than 30 parts by mass, more preferably not more than 10 parts by mass, based on 100 parts by mass of the (meth)acryloyl group-containing acrylic copolymer. The polyfunctional (meth)acrylate oligomer contains two or more (meth)acryloyl groups per molecule, and examples thereof include tricyclodecanedimethylol diacrylate, bisphenol F ethylene oxide-modified diacrylate, bisphenol A ethylene oxide-modified diacrylate, isocyanuric acid ethylene oxide-modified diacrylate, polypropylene glycol diacrylate, polyethylene glycol diacrylate, trimethylolpropane triacrylate, trimethylolpropane propylene oxide-modified triacrylate, trimethylolpropane ethylene oxide-modified triacrylate, pentaerythritol triacrylate, pentaerythritol tetraacrylate, ditrimethylolpropane tetraacrylate, dipentaerythritol pentaacrylate, dipentaerythritol hexaacrylate, and urethane acrylate. One of or a combination of two or more of them may be incorporated.

The ionizing radiation-curable composition may be coated after dilution with 10 to 1000 parts by mass, based on 100 parts by mass of the (meth)acryloyl group-containing acrylic copolymer, of a solvent. Dilution with the solvent can impart a proper viscosity, for example, a viscosity of 10 to 3000 mPa·sec at 25° C., to the coating solution and, at the same time, in the step of drying the coating, can realize proper transfer of the silicone compound onto the surface.

Solvents usable herein include, for example, aromatic hydrocarbon solvents such as toluene and xylene, ketone solvents such as methyl ethyl ketone, methyl isobutyl ketone, and cyclohexanone, ester solvents such as ethyl acetate, butyl acetate, and isobutyl acetate, glycol ether ester solvents such as diethylene glycol ethyl ether acetate, propylene glycol methyl ether acetate, propylene glycol monomethyl ether, 3-methyl-3-methoxybutyl acetate, and ethyl-3-ethoxypropionate, ether solvents such as tetrahydrofuran and dioxane, and aprotic polar solvents such as N-methylpyrrolidone.

The coating solution may be coated by conventional methods such as direct gravure coating, reverse gravure coating, gravure offset coating, microgravure coating, direct roll coating, reverse roll coating, curtain coating, knife coating, air knife coating, bar coating, die coating, and spray coating. After coating onto the thermoplastic film, the coating is dried and heated at a temperature of 90 to 130° C. in a drying oven to evaporate the solvent and thus to heat cure the ionizing radiation-curable composition. This temperature is above the softening point of the ionizing radiation-curable composition and is below the melting point of the ionizing radiation-curable composition.

The thickness of the ionizing radiation-cured film is preferably 1 to 50 μm, more preferably 3 to 20 μm. When the thickness is smaller than 1 μm, fine embosses cannot be transferred well. On the other hand, when the thickness of the ionizing radiation-cured film exceeds 50 μm, the curability of the resin is sometimes deteriorated. As described above, when the ionizing radiation-cured film has a multilayered structure of two or more layers, the thickness of each of all the layers falls within the above-defined range.

The heat-cured ionizing radiation-curable composition can be cured by an ionizing radiation through the application of ultraviolet light or electron beams from the heat-cured silicone layer side after embossing. Ultraviolet light sources usable herein include low pressure mercury lamps, medium pressure mercury lamps, high pressure mercury lamps, metal halide lamps, xenon lamps, and tungsten lamps. Electron beam irradiation methods include scanning methods, curtain beam methods, and broad beam methods, and 50 to 300 kV is suitable as the acceleration voltage of the electron beam.

(6) Heat-Cured Silicone Layer

The heat-cured silicone layer used in the present invention is formed by heat-curing a heat-curable silicone composition comprising an alkenyl group-containing organopolysiloxane, an organohydrogenpolysiloxane, and a platinum-based curing catalyst.

The following compounds may be mentioned as one example of the alkenyl group-containing organopolysiloxane.

[Chemical formula 1]

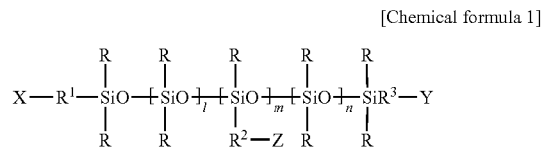

wherein R mainly represents a methyl group but may represent other alkyl group, an aryl group such as a phenyl group, or a combination thereto; l+m+n is an integer of one or more, and the siloxane units may be randomly arranged; at least one of X, Y, and Z represents an addition polymerizable group such as a vinyl group, an allyl ($-CH_2-CH=CH_2$) group, or an (meth)acryloyl group; and $R^1$ to $R^3$ each represent a single bond or an alkylene group.

The molecular weight of the alkenyl group-containing organopolysiloxanes is not particularly limited but is generally preferably in the range of 3,500 to 20,000. These alkenyl group-containing organopolysiloxanes are commercially available and can easily be used in the present invention.

The organohydrogenpolysiloxane used in the present invention is represented by the above general formula wherein at least one of $-R^1-X$, $-R^2-Z$, and $-R^3-Y$ represents a hydrogen atom, and the other substituents, the arrangement of siloxane units, and the molecular weight and the like are the same as described above in connection with the general formula. These alkenyl group-containing organopolysiloxanes are commercially available and can easily be used in the present invention.

The ratio of the alkenyl group-containing organopolysiloxane to the organohydrogenpolysiloxane used is determined by the molar ratio of the reactive groups possessed by the alkenyl group-containing organopolysiloxane and the organohydrogenpolysiloxane and is preferably in the range of 4:1 to 1:4, particularly preferably in the range of 1:1 to 1:3. When the ratio of the alkenyl group-containing organopolysiloxane to the organohydrogenpolysiloxane used is outside the above-defined range, lowered releasability, lowered coating film strength, unreacted reactive group-derived deteriorated storage stability and the like occur and, consequently, satisfactory properties are not provided.

In the present invention, a platinum-based curing catalyst is further used. The amount of the catalyst used is preferably approximately 5 to 200 parts by mass based on 100 parts by mass of the alkenyl group-containing organopolysiloxane and the organohydrogenpolysiloxane.

In the heat-curable silicone composition comprising the alkenyl group-containing organopolysiloxane, the organohydrogenpolysiloxane, and the platinum-based curing catalyst, a reaction proceeds even at room temperature, and the progress of the reaction in the coating solution is causative of lowered releasability and poses problems of storage stability and handleability of the coating solution. In the present invention, in order to solve such problems, a reaction inhibitor may be used that exhibits a reactive inhibitory effect against the heat-curable silicone composition at room temperature and loses the inhibitory effect by heat treatment. Specifically, the reaction inhibitor used in the present invention is a material that inhibits the action of the curing catalyst against the heat-curable silicone composition in a solvent solution form and does not inhibit but rather accelerates the action of the curing catalyst in a heated state or a solvent vaporized state, that is, a heated or dried state. For example, a silylation product of acetylene alcohol may be mentioned as the curing inhibitor. The reaction inhibitor may be a commercially available product. The reaction inhibitor is preferably used in an amount of approximately 5 to 100 parts by mass based on 100 parts by mass of the heat-curable silicone composition.

The heat-curable silicone composition may be a commercially available product. For example, the heat-curable silicone composition may be prepared by mixing a main agent (KS-3603, manufactured by Shin-Etsu Chemical Co., Ltd.) of an addition polymerizable silicone material comprising a mixture of an alkenyl group-containing organopolysiloxane with an organohydrogenpolysiloxane with a curing agent (CAT-PL-50T, manufactured by Shin-Etsu Chemical Co., Ltd.) comprising a platinum-based curing catalyst.

The heat-curable silicone composition is a material that is solid at room temperature and becomes liquid by heating in processing.

The heat-curable silicone composition according to the present invention should be curable to fix the fine concave and convex pattern formed by embossing and provide satisfactory film properties such as strength.

The heat-curable silicone layer according to the present invention may be formed by carrying out coating, drying/heating, aging and the like of the heat-curable silicone composition in the same manner as in the formation of a dye-receptive layer. The thickness of the formed heat-cured silicone layer is preferably in the range of 0.01 to 20 μm.

(7) Process for Producing Embossed Release Paper

The embossed release paper according to the present invention is a product obtained by providing a laminate comprising a paper base material and an ionizing radiation-cured resin layer and a heat-cured silicone layer stacked on the paper base material and curing the laminate with an ionizing radiation. The production process of the embossed release paper is not limited as long as the surface of the embossed release paper can have embosses. Specifically, the embossed release paper can be produced by stacking an ionizing radiation-curable resin composition layer and a heat-curable silicone composition layer on a paper base material to prepare a laminate, embossing the laminate, and curing the laminate by ionizing radiation curing treatment (see FIG. 3). An embossed release paper with matte embosses formed thereon can also be produced by using a matte paper base material.

When further stacking of a thermoplastic resin layer as an intermediate layer is contemplated, the laminate is preferably produced by stacking a thermoplastic resin layer onto a paper base material, then surface-treating the thermoplastic resin layer to form a surface treated layer, stacking an ionizing radiation-curable resin composition layer and a heat-curable silicone composition layer onto the surface treated layer. For example, as shown in FIG. 2 (b), when the laminate comprises a paper base material (40), a second polyolefin resin layer (30A'), a first polyolefin resin layer (30A"), a surface treated layer (33) provided on the first polyolefin resin layer (30A"), an ionizing radiation-cured resin layer (20), and a heat-cured silicone layer (10), as shown in FIG. 4, a resin composition (2) for constituting a second polyolefin resin layer and a resin (1) for constituting a first polyolefin resin layer are charged into an extruder A (70) and an extruder B (70'), respectively. The resin composition (2) and the resin (1) are coextruded on the paper base material (40) through a T die (75) and are stacked and adhered onto the paper base material (40) by a backup roll (60) and a cooling roll (50). Subsequently, for example, a surface treated layer (33) is formed on the first polyolefin resin layer (30A"), for example, by corona treatment. The heating temperature of the extruder A (70) and the extruder B (70') may be properly selected, for example, according to the melting point and melt flow rate of the resin used, the type and amount of a mattering agent incorporated.

Next, an ionizing radiation-curable composition is coated onto a paper base material or the surface treated layer, and the formed ionizing radiation-curable composition film is cured by drying and heating. A heat-curable silicone composition is then coated onto the heat cured ionizing radiation-curable composition film, and the formed heat-curable silicone composition film is heated and dried to form a heat-cured silicone film. Thus, an unembossed laminate can be produced.

In the present invention, the unembossed laminate is embossed to form a specific concave and convex pattern to produce an embossed release paper. For example, when an engraved squeeze pattern similar to that in a natural leather is formed on the release paper, a synthetic leather more close to the natural leather can be produced. Further, for example, when a woodgrain pattern, a leaf-shaped pattern, or other design concave and convex pattern is formed on the release paper, a matte and unique pattern can be transferred onto the surface of the synthetic leather or melamine decorative sheet produced.

The concave and convex pattern can be formed by embossing on the surface of the embossed release paper, for example, by passing the matte embossed release paper into an embossing machine comprising an emboss roll having on its surface a mold having a concave and convex pattern and a paper roll or metal roll which faces the emboss roll to receive the concaves and convexes in the emboss roll, or an embossing machine comprising the emboss roll and a metal roll which faces the emboss roll and has surface concaves and convexes corresponding to the shape of concaves and convexes in the emboss roll, and pressing the matte embossed release paper by the heated emboss roll to form a concave and concave pattern.

In the above embodiment, a pair of emboss rolls are used. Alternatively, two pairs of emboss rolls may be used to produce release papers having a higher contrast. The release paper may also be produced, for example, by a process comprising the steps of forming a first concave and convex shape on an original sheet by embossing and forming a second concave and convex shape, on the surface of the original sheet with the first concave and convex shape formed thereon, which is coarser than the first concave and convex shape, by embossing, wherein the second concave and convex shape is formed on the original sheet so as to smoothen the first concave and convex shape located on concaves in the second concave and convex shape while maintaining the first concave and convex shape located on convexes in the second concave and convex shape. Thus, a release paper characterized by comprising a concave and convex shape having concaves and convexes and a fine concave and convex shape which is finer than the above concave and convex shape and is formed on the convexes can be produced.

The release paper thus obtained is shown in FIG. 5. A second concave and convex shape (110) comprising concaves (110b) and convexes (110a) is formed on the surface of the release paper (100). Further, a first concave and convex shape (also called a fine concave and convex shape) 120 which is finer than the second concave and convex shape (110) is formed on convexes (110a) in a second concave and convex shape (110). Preferably, the first concave and convex shape 120 is formed so as to constitute the so-called matte surface, for example, so as to have an arithmetical mean surface roughness Ra of 0.8 to 4.0 μm. On the other hand, the bottom surface of the concaves (110b) in the second concave and convex shape (110) is preferably formed in a flat form. The formed release paper (100) comprises the first concave and convex shape 120 provided on the convexes (110a) in the second concave and convex shape (110). Accordingly, when the release paper (100) is used as a pattern paper, as shown in FIG. 5, a fine concave and convex shape (a matte surface) (140) formed by the transfer of the first concave and convex shape (120) in the release paper (100) is formed within concaves (130b) in a pattern (130) formed on the surface of a molded product (150) such as a synthetic leather or a melamine decorative sheet onto which convexes (110a) in the second concave and convex shape (110) in the release paper (100) have been transferred. Light incident within the concaves (130b) on the surface of the molded product (150) is viewed only in a small light quantity due to irregular reflection, and, consequently, the contrast against the interior of the concaves (110b) in the second concave and convex shape (110) formed as a flat surface is high. Accordingly, a transferred pattern (130) on the surface of the molded product (150) has a very high contrast between the convexes (130a) and the concaves (130b), and the top of the convexes (130a) is glossy.

Figure 7:
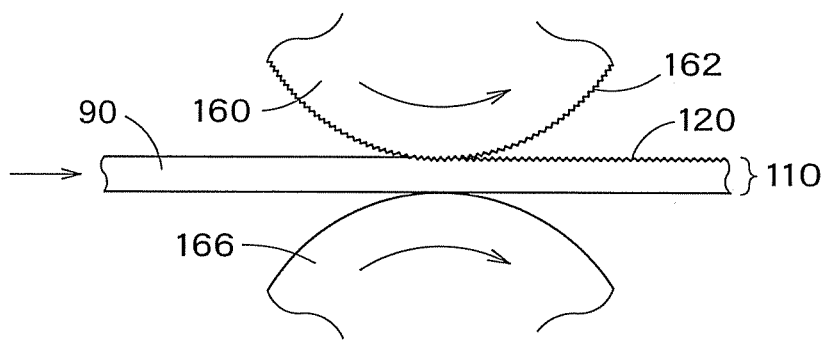
FIG. 7 is a cross-sectional view showing one embodiment of a process for producing an embossed release paper according to the present invention.
Figure 8:
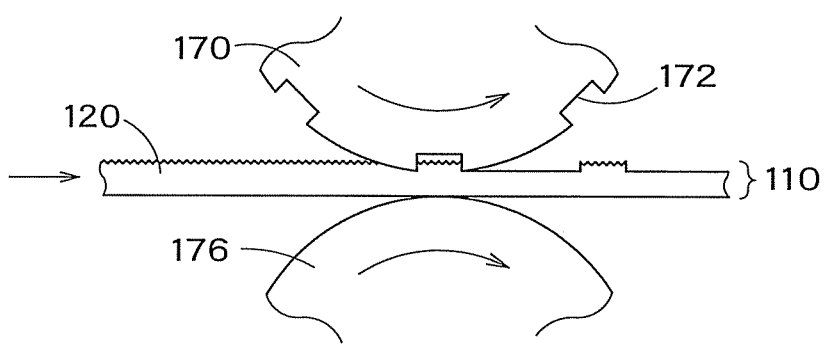
FIG. 8 is a cross-sectional view showing one embodiment of a process for producing an embossed release paper according to the present invention.

For example, as shown in FIGS. 6 to 8, the release paper (100) is produced with an embossing device (200) comprising a first emboss roll (160) having first concaves and convexes (162) on the outer periphery thereof, a first backup roll (166) which is disposed so as to face the first emboss roll (160) and presses an original release paper (90) in such a state that the original release paper (90) is held between the first emboss roll (160) and the first backup roll (166), a second emboss roll (170) having, on the outer periphery thereof, second concaves and convexes (172) including coarser concaves and convexes than the concaves and convexes (162) in the first emboss roll (160), and a second backup roll (176) which is disposed so as to face the second emboss roll (170) and presses the original release paper (90) in such a state that the original release paper (90) is held between the second backup roll (176) and the second emboss roll (170). The embossing device (200) further comprises an original sheet supply device (not shown) that continuously supplies the unembossed and extended strip-like original release paper (90), and a release paper recovery device (not shown) that winds and recovers the release paper (100) produced by embossing the original release paper (90).

The second concaves and convexes (172) provided on the outer peripheral surface of the second emboss roll (170) are formed as a pattern that can impart a skin pattern to the surface of the original release paper (90). On the other hand, the first concaves and convexes (162) provided on the outer peripheral surface of the first emboss roll (160) are formed as a pattern that can render the surface of the original release paper (90) matte. As shown in FIG. 6, the second emboss roll (170) and the second backup roll (176) are disposed on the downstream side of the first emboss roll (160) and the first backup roll (166). Accordingly, the original release paper (90) supplied from the original sheet supply device is first passed through between the first emboss roll (160) and the first backup roll (166) and is then passed through between the second emboss roll (170) and the second backup roll (176).

At the outset, the relative position between the first emboss roll (160) and the first backup roll (166) and the relative position between the second emboss roll (170) and the second backup roll (176) are regulated so that the original release paper (90) is pressed under a proper pressure in a held state between the first emboss roll (160) and the first backup roll (166) and is pressed in a held state between the second emboss roll (170) and the second backup roll (176). Thereafter, the original release paper (90) is supplied from the original sheet supply device. The original release paper (90) supplied from the original sheet supply device is first supplied in between the first emboss roll (160) and the first backup roll (166). The original release paper (90) is pressed in a held state between the first emboss roll (160) and the first backup roll (166). A paper base material (40) in the original release paper (90) faces the first backup roll (166). Consequently, a first concave and convex shape (a matte pattern) (120) corresponding to the shape of the second concaves and convexes (162) in the first emboss roll (160) is formed on the surface of the heat-cured silicone layer (10) in the original release paper (90). That is, as shown in FIG. 7, the first concave and convex shape (matte pattern) (110) is formed on the whole surface of the heat-cured silicone layer (10).

The original release paper (90) is then supplied in between the second emboss roll (170) and the second backup roll (176) and is again pressed in a held state between the second emboss roll (170) and the second backup roll (176). The original release paper (90) is supplied so that the heat-cured silicone layer (10) in the original release paper (90) faces the second emboss roll (170) and the paper base material (40) in the original release paper (90) faces the second backup roll (176). Thus, the second concave and convex shape (skin pattern) (110) corresponding to the shape of the second concaves and convexes (172) in the second emboss roll (170) is formed on the surface of the heat-cured silicone layer (10) in the original release paper (90).

In forming the second concave and convex shape (110), a high pressing pressure is applied to the area where the concaves (110b) in the second concave and convex shape (110) are formed. That is, the convexes (172a) in the second concaves and convexes (172) in the second emboss roll (170) press the original release paper (90) at a high pressure. Accordingly, as shown in FIG. 8, the fine first concave and convex shape (120), present on the surface of the original release paper (90), in its parts where the concaves (110b) in the second concave and convex shape (110) are to be formed, is rendered smooth by pressing, and the bottom surface of the concaves (110b) in the second concave and convex shape (110) on the surface of the original release paper (90) is flattened. On the other hand, in forming the second concave and convex shape (110), only a relatively low pressing pressure is applied to the area where the convexes (110a) in the second concave and convex shape (110) are formed. Accordingly, the first concave and convex shape (120) to be located on the convexes (110a) in the second concave and convex shape (110) can remain. Among others, the first concave and convex shape (120) which is to be located on the convexes (110a) in the second concave and convex shape (110) can be allowed to remain uncollapsed when the depth (gap) of the concaves (172b) in the second concaves and convexes (172) in the second emboss roll (170) is large, specifically when, as shown in FIG. 8, the depth (gap) of the concaves (172b) in the second concaves and convexes (172) in the second emboss roll (170) is larger than the height of the convexes (110a) in the second concave and convex shape (110) to be formed.

Thus, a release paper (100) comprising an original release paper (90) having a surface on which a coarse concave and convex shape (a second concave and convex shape) (110) having concaves (110a) and convexes (110b) has been formed, a fine concave and convex shape (a first concave and convex shape) (120) having been formed on the convexes (110a), the interior of the concaves (110b) having been flattened, can be produced. At the outset, a fine first concave and convex shape (120) is formed on an original release paper (90), and a coarse second concave and convex shape (110) is then formed on the original release paper (90). In forming a second concave and convex shape (110), a large pressing pressure is applied to the area where concaves (110b) are formed while only a relatively low pressing pressure is applied to the area where convexes (110a) are formed. Accordingly, the first concave and convex shape (120) which is to be located on convexes (110a) in the second concave and convex shape (110) can be allowed to remain as they are. At the same time, the first concave and convex shape (120) to be located on the concaves (110b) in the second concave and convex shape (110) can be rendered smooth. As a result, when a molded product (150) such as a synthetic leather or a melamine decorative sheet using the release paper (100) as a pattern paper is produced, the surface of convexes (130a) in a pattern (130) transferred onto the molded product (150) is smooth. On the other hand, a fine concave and convex pattern (140) is formed on the bottom of concaves (130b) in the pattern (130) transferred onto the molded product (150). Thus, in the pattern (130) transferred onto the molded product (150), the contrast between the convexes (130a) and the concaves (130b) in the pattern (130) is high, and the top of the convexes (130a) is glossy.

In the above process, the contrast of the pattern (130) transferred onto the molded product (150) is enhanced by the fine first concave and convex shape (120) present on the convexes (110a) in the second concave and convex shape (110) rather than the gap between the concaves (110b) and the convexes (110a) in the second concave and convex shape (110) in the release paper (100). Accordingly, there is no need to apply a high pressing pressure to the original release paper (90) during the production of the release paper (100). Thus, the release paper (100) can be produced with a high production efficiency, and, at the same time, damage to the original release paper (90), especially the paper base material (40), can be reduced. Further, the production cost and maintenance cost of the embossing device (200) can be reduced.

Further, according to this embodiment, the bottom of the concaves (110b) in the second concave and convex shape (110) is flattened. This release paper can transfer a pattern having a very high level of gloss to the molded product (150).

Furthermore, in the step of forming the first concave and convex shape (120), the first concave and convex shape (120) is formed in the whole area where the second concave and convex shape (110) in the original release paper (90) is to be formed. According to this embodiment, a close registration between the position of the first concave and convex shape (120) on the original release paper (90) and the position of the second concave and convex shape (110) on the original release paper (90) is unnecessary. The first concave and convex shape (120) which is formed on the original release paper (90) but is unnecessary is rendered smooth during the formation of the second concave and convex shape (110).

Accordingly, the release paper (100) comprising the first concave and convex shape (120) formed only at desired positions can be produced with a high production efficiency.

The above embodiment is an example in which the first concave and convex shape (120) is formed on the whole area of the original release paper (90) on its heat-cured silicone layer (10) side. The present invention, however, is not limited to this embodiment, and the first concave and convex shape (120) may be formed, for example, only on the original release paper (90) in its area where the second concave and convex shape (110) is formed, or only on the original release paper (90) in its area where the convexes (110a) in the second concave and convex shape (110) is formed.

In the present invention, regardless of the use of one pair of emboss rolls or two pairs of emboss rolls as described above, conditions of an emboss roll heating temperature of 50 to 150° C. and a pressure of 40 to 100 kgf/cm generally suffice for the emboss forming step. The temperature is above the softening point of the ionizing radiation-curable composition and is below the melting point of the resin. The emboss roll is generally heated, for example, by passing steam through the emboss roll to heat the roll per se. Alternatively, a preheating method may also be adopted in which the ionizing radiation-curable composition is previously heated immediately before embossing. The embossing may be carried out by a flat press using a flat emboss plate without using any emboss roll.

After embossing, ultraviolet light or electron beams are irradiation from the heat-cured silicone film side to cure the heat-cured ionizing radiation-curable composition film to form an ionizing radiation-cured resin layer. Ultraviolet light sources usable herein include low-pressure mercury lamps, medium-pressure mercury lamps, high-pressure mercury lamps, metal halide lamps, xenon lamps, and tungsten lamps. Electron beam irradiation methods include scanning methods, curtain beam methods, and broad beam methods, and 50 to 300 kV is suitable as the acceleration voltage of the electron beam. Thus, the coatability of the heat-curable silicone composition can be improved by heat-curing the ionizing radiation-curable composition before embossing, and the shapeability in the embossing can be ensured by curing the heat-cured ionizing radiation-curable composition after embossing with an ionizing radiation.

The thickness of the embossed release paper according to the present invention before embossing is preferably 30 to 500 μm, more preferably 100 to 300 μm. When the thickness is smaller than 30 μm, in some cases, the shapability is lowered and line aptitude such as increased susceptibility to breaking during winding in the production process is also lowered. On the other hand, when the thickness exceeds 500 μm, the width curling of the embossed release paper is increased and, consequently, the embossability is sometimes lowered.

On the other hand, as described above, an embossed release paper with matte embosses formed thereon can also be produced by using a matte paper base material.

Further, in the present invention, a laminate comprising at least a paper base material, an ionizing radiation-curable resin composition layer, and a heat-curable silicone composition layer stacked on top of one another may be used as a process release paper without being embossed. In other words, the unembossed laminate as such may be used as the process release paper. Even when the shaping surface is an emboss-free specular surface, the specular surface can be transferred onto an object. That is, the high specular surface shaping properties are common to this process release paper and the embossed release paper. In this case, the surface of the unembossed laminate, that is, the process release paper comprising a paper base material, an ionizing radiation-curable resin composition layer, and a heat-curable silicone composition layer, stacked on top of one another, is not limited to the specular surface but may be a crepey, semi-matte, or matte surface. Even when the surface of the process release paper is a concave and convex-free specular surface, a crepey surface, a semi-matte surface, or a matte surface, by virtue of the high shaping properties, the surface shape can be transferred onto the object. The surface (shaping surface) such as the crepey, semi-matte, or matte surface can be provided, for example, by stacking the ionizing radiation-cured resin layer and the heat-cured silicone layer onto a matte paper base material. This is based on finding that the unembossed laminate produced using a specific ionizing radiation-cured resin layer can be used as a process release paper even when the laminate is not embossed by an emboss roll. In this respect, the present invention relates to a process release paper comprising a paper base material, an ionizing radiation-cured resin layer, and a heat-cured silicone layer stacked in that order.

More specifically, the process release paper may comprise a paper base material, an ionizing radiation-cured resin layer, and a heat-cured silicone layer stacked in that order, wherein the ionizing radiation-cured film has been formed by curing an ionizing radiation-curable composition formed of an (meth)acryloyl group-containing acrylic copolymer (I) having a weight average molecular weight (Mw) of 5,000 to 200,000, a variance ratio (Mw/Mn) of 1.0 to 5.0, and a glass transition temperature (Tg) of 40 to 150° C. by ionizing radiation irradiation, and the (meth)acryloyl group-containing acrylic copolymer (I) is a copolymer produced by reacting an epoxy group-containing copolymer (C) comprising (meth)acrylate monomer units (A) and epoxy group-containing (meth)acrylate monomer units (B) with (meth)acrylic acid. Alternatively, the ionizing radiation-cured film may have been formed by curing an ionizing radiation-curable composition formed of an (meth)acryloyl group-containing acrylic copolymer (II) produced by reacting a copolymer comprising 35 to 80 parts by mass of an (meth)acrylic ester, 20 to 60 parts by mass of a glycidyl(meth)acrylic ester, and 0 to 30 parts by mass of other (meth)acrylic ester with 10 to 30 parts by mass of (meth)acrylic acid by ionizing radiation irradiation.

(8) Production Process of Synthetic Leather

A synthetic leather can be produced using the embossed release paper according to the present invention in the same manner as in the production of a synthetic leather using the conventional release paper.

At the outset, a resin composition for a synthetic leather is coated onto the heat-cured silicone layer in the embossed release paper. A pattern (a concave and convex pattern) corresponding to the concave and convex pattern shape of the heat-cured silicone layer is formed in the resin layer coated on the heat-cured silicone layer. Thereafter, a backing fabric (for example, a woven fabric or a nonwoven fabric) is laminated thereonto, the resin layer is dried and cooled, and the release paper is separated to produce a synthetic leather. Resins such as polyurethane and polyvinyl chloride may be used in the resin composition for synthetic leathers. When polyurethane is used, the solid content of the resin composition is preferably approximately 20 to 50% by mass. Further, when polyvinyl chloride is used, the use of a resin composition produced by mixing and dispersing a plasticizer such as dioctyl phthalate or dilauryl phthalate, a foaming agent, and a stabilizer into polyvinyl chloride is preferred. The resin composition may be coated by a conventional coating method such as knife coating, roll coating, or gravure coating. In the production of the synthetic leather using the embossed release paper according to the present invention, even in the production of a vinyl chloride leather which is carried out under high-temperature conditions, the separation of the thermoplastic resin layer from the paper base material can be prevented, and the presence of the ionizing radiation-cured resin layer having high heat resistance and high mechanical strength and the presence of the heat-cured silicone layer having high separability can realize repeated stable production of synthetic leathers.

As described above, synthetic leathers can also be produced using an unembossed emboss-free laminate as a process release paper. For example, when a process release paper having a concave and convex-free specular surface instead of the embossed surface is used for synthetic leather production, a synthetic leather having a surface shaped in the specular surface form can be produced. A highly glossy surface having a gloss of not less than 60 at 60-degree reflection may be mentioned as an example of the specular surface. When the shaping surface of the process release paper is, for example, a crepey, semi-matte, or matte surface, a synthetic leather having this surface can be produced.

(9) Production of Melamine Decorative Sheet

A melamine decorative sheet can be produced using the embossed release paper according to the present invention in the same manner as in the conventional shaping sheet.

At the outset, as shown in FIG. 9, four sheets of a core paper (320) impregnated with a melamine resin are superimposed on a backing paper (310), and a melamine resin-impregnated decorative paper (330) and a melamine resin-impregnated overlay paper (340) are superimposed in that order on the assembly. The embossed release paper (100) according to the present invention is superimposed on the overlay paper (340) so that the heat-cured silicone surface (10) having embosses is brought into contact with the overlay paper (340). The assembly is then held between two planished metal plates (400A, 400B) and is heated and pressed by a pressing machine under conditions of a temperature of room temperature to 180° C., a pressure of 70 to 120 kg/cm$^2$, and a heating time of 10 min to 2 hr to prepare a laminate. The pressing may be carried out a plurality of times under varied heating and pressure conditions, that is, at varied temperature and pressure. In any event, pressing causes a melamine resin to be oozed out from the overlay paper (340) and the melamine resin-impregnated decorative paper (330) onto the surface of the laminate, and the oozed melamine resin is cured to form a melamine resin layer. A concave and convex pattern is formed by the embossed release paper (100) on the surface of the melamine resin layer. After pressing, the assembly is cooled to room temperature and is then taken out of the pressing machine, and the embossed release paper (100) is separated to prepare a melamine decorative sheet (300) having a concave and convex pattern layer on its surface. The melamine decorative sheet (100) may also be produced by stacking 2 to 20 sheets of the laminate material on top of one another and subjecting the assembly to multistage pressing. Further, as shown in FIG. 10, the melamine decorative sheet (300) can also be produced by superimposing two laminate materials as described above so as to face each other and pressing the assembly. Thus, the present invention can be advantageously used in such multistage pressing.

A low-pressure melamine decorative sheet which can be produced at a low pressure of 10 to 40 kg/cm$^2$ using a play wood or a hard board instead of the core paper may be mentioned as one of melamine decorative sheets. The embossed release paper according to the present invention is also suitable for the production of the low-pressure melamine decorative sheet.

The embossed release paper according to the present invention has high heat resistance, solvent resistance, and separability. Accordingly, the separation of the thermoplastic resin layer from the paper base material can be prevented even at high temperatures under which the melamine decorative sheet is produced, and repeated stable production of melamine decorative sheets can be realized by virtue of the presence of the ionizing radiation-cured resin layer having high mechanical strength and the presence of the heat-cured silicone layer having high separability.

When the unembossed laminate which has no emboss and has a concave and convex-free specular surface as the shaping surface instead of the embossed surface is used as a process release paper, a melamine decorative sheet having a surface shaped in the specular surface form can be produced. A highly glossy surface having a gloss of not less than 60 at 60-degree reflection can be mentioned as an example of the specular surface. As described above, when the shaping surface of the process release paper is a crepey, semi-matte, or matte surface instead of the specular surface, a melamine decorative sheet having a surface shaped in a crepey, semi-matte, or matte form can be produced.

EXAMPLES

The present invention will be described in more detail with reference to specific Examples.

Synthesis Example 1

30 g of methyl methacrylate and 70 g of glycidyl methacrylate as monomers and 90 g of methyl ethyl ketone as a solvent were placed in a glass flask equipped with a stirrer, a dropping funnel, a reflux condenser, a nitrogen gas introduction tube, and a thermometer, and the contents were heated to 80° C. A solution of 1.0 g of 2,2'-azobis(2,4-dimethylvaleronitrile) as a polymerization initiator dissolved in 12 g of methyl ethyl ketone was then added dropwise over a period of 3 hr, and, further, a polymerization reaction was allowed to proceed at 80° C. for 3 hr to give a methyl ethyl ketone solution of an epoxy group-containing copolymer A1 (solid content: 50.1%). Subsequently, the temperature was maintained at 80° C., and, in this state, while introducing dry air, 0.05 g of hydroquinone monomethyl ether, 1.0 g of triphenylphosphine, 25 g of acrylic acid, and 25 g of methyl ethyl ketone were added. In this state, a reaction was allowed to proceed for 35 hr to give a methyl ethyl ketone solution of an (meth)acryloyl group-containing acrylic copolymer (solid content: 50.6%, Mn=11000, Mw=21000). The copolymer had a glass transition temperature of 62° C. and a double bond equivalent of 3.6. The results were as shown in Table 1.

Synthesis Examples 2 to 13

Polymerization and reactions were carried out in the same manner as in Synthesis Example 1, except that the starting materials were changed to those shown in Tables 1 and 2. Thus, methyl ethyl ketone solutions of (meth)acryloyl group-containing acrylic copolymers (solid content: 50.8%) were produced. The weight average molecular weight, number average molecular weight, glass transition temperature, and double bond equivalent of the copolymers are shown in Tables 1 and 2. Only for Synthesis Example 8, the amount of 2,2'-azobis(2,4-dimethylvaleronitrile) used was changed to 2.6 g to change the weight average molecular weight of the copolymer.

Abbreviations in the tables are as follows.
IBX: isobornyl methacrylate,
MMA: methyl methacrylate,
BMA: butyl methacrylate,
IBMA: isobutyl methacrylate,
GMA: glycidyl methacrylate,
AA: acrylic acid,
Mn: number average molecular weight, and
Mw: weight average molecular weight

TABLE 1

|  |  | Synthesis Example 1 | Synthesis Example 2 | Synthesis Example 3 | Synthesis Example 4 | Synthesis Example 5 | Synthesis Example 6 | Synthesis Example 7 |
|---|---|---|---|---|---|---|---|---|
| Resin composition | IBX |  |  |  |  |  | 10 | 10 |
|  | MMA | 30 | 55 | 50 | 30 | 50 | 40 | 40 |
|  | IBMA |  |  |  | 10 |  |  |  |
|  | GMA | 70 | 45 | 50 | 60 | 50 | 50 | 50 |
|  | AA | 35 | 22.5 | 25 | 30 | 25 | 25 | 25 |
| Molecular weight | Mw | 21000 | 23000 | 29000 | 33000 | 36000 | 36000 | 39000 |
|  | Mn | 11000 | 12000 | 13000 | 15000 | 16000 | 16000 | 18000 |
|  | Mw/Mn | 1.9 | 1.9 | 2.2 | 2.2 | 2.3 | 2.3 | 2.2 |
| Tg (° C.) |  | 62 | 76 | 72 | 62 | 72 | 78 | 78 |
| Double bond equivalent (meq/g) |  | 3.6 | 2.6 | 2.8 | 3.2 | 2.8 | 2.8 | 2.8 |

TABLE 2

|  |  | Synthesis Example 8 | Synthesis Example 9 | Synthesis Example 10 | Synthesis Example 11 | Synthesis Example 12 | Synthesis Example 13 |
|---|---|---|---|---|---|---|---|
| Resin composition | IBX | 10 | 40 | 30 |  |  | 65 |
|  | MMA | 40 |  | 60 | 50 |  |  |
|  | BMA |  |  |  |  | 30 |  |
|  | IBMA |  |  |  | 25 | 30 |  |
|  | GMA | 50 | 60 | 10 | 25 | 40 | 35 |
|  | AA | 25 | 30 | 5 | 12.5 | 20 | 17.5 |

TABLE 2-continued

|  | | Synthesis Example 8 | Synthesis Example 9 | Synthesis Example 10 | Synthesis Example 11 | Synthesis Example 12 | Synthesis Example 13 |
|---|---|---|---|---|---|---|---|
| Molecular weight | Mw | 18000 | 27000 | 62000 | 38000 | 40000 | 42000 |
|  | Mn | 9000 | 13000 | 23000 | 16000 | 18000 | 18000 |
|  | Mw/Mn | 2.0 | 2.1 | 2.7 | 2.4 | 2.2 | 2.3 |
| Tg (° C.) | | 78 | 62 | 117 | 75 | 35 | 122 |
| Double bond equivalent (meq/g) | | 2.8 | 3.6 | 0.7 | 1.5 | 2.3 | 2.0 |

<Measuring Conditions>

(1) The weight average molecular weight (Mw) of the (meth)acryloyl group-containing acrylic copolymer was measured under the following conditions.

(i) Column; [TSK-GEL MULTIPORE HXL-M×4](manufactured by TOSOH CORPORATION)

(ii) Column temp.; 40° C.

(iii) Eluting solution; tetrahydrofuran (THF)

(iv) Detector; RI (v) Detector temp.; 40° C.

(vi) Standard substance; polystyrene (2) The double bond equivalent was calculated on the basis of the composition ratio.

(3) For Tg (glass transition temperature), the design value of the resin was calculated according to the following formula. The glass transition temperatures of homopolymers represented by $Tg_1$, $Tg_2$ ... are values described in Polymer Handbook.

$$1/Tg = (w_1/Tg_1 + w_2/Tg_2 + w_3/Tg_3 + \ldots + w_n/Tg_n +)$$

In the formula, 1, 2 ... n: type of constituent monomer; $Tg_n$: glass transition temperature (K) of homopolymer of nth monomer; $w_n$: weight ratio of nth monomer units in the constituent monomers; and Tg: glass transition temperature (K).

Synthesis Example 14

A heat-curable silicone ionizing radiation-curable composition was produced by mixing 100 parts by mass of a main agent formed of an addition polymerizable silicone material formed of a mixture of an alkenyl group-containing organopolysiloxane with an organohydrogenpolysiloxane (KS-3603, manufactured by Shin-Etsu Chemical Co., Ltd.), 5 parts by mass of a curing agent formed of a platinum-based curing catalyst (CAT-PL-50T, manufactured by Shin-Etsu Chemical Co., Ltd.), and toluene as a diluting solvent added to give a solid content of 10% by mass.

Experiment Example 1

An ionizing radiation curable composition was produced by mixing 100 parts by mass of the (meth)acryloyl group-containing acrylic copolymer produced in Synthesis Example 2, 3 parts by mass of a photopolymerization initiator (Irgacure 907, manufactured by Ciba Specialty Chemicals, K.K.), and methyl ethyl ketone as a diluting solvent added to a solid content of 30% by mass.

A neutralized paper (basis weight 130 g/m²) was provided as paper for constituting a base material, and a polypropylene resin layer (30 μm) was formed by extrusion coating on the paper, and the coating was then subjected to corona treatment (7 kw) to prepare a paper/polypropylene base material. Next, the ionizing radiation curable composition produced above was bar coated onto the polypropylene layer to a coating thickness of about 5 g/m² on a dry basis, and the coating was dried by heat evaporation at 110° C. for one min to form a heat cured ionizing radiation-curable composition film.

The heat curable silicone composition was bar coated onto the heat cured ionizing radiation-curable composition film to a coating thickness of 0.5 g/m² on a dry basis, and the coating was dried by heat evaporation and heat cured at 120° C. for one min to form a heat cured silicone film.

Thereafter, the surface of the coating film was embossed. The embossing was carried out by pressing a paper roll as a backup roll with a female die against a metal emboss roll having a concave and convex pattern. In this case, the temperature of the emboss roll was brought to 120° C., and the support, the heat cured silicone film and the dried coating film of the ionizing radiation curable resin were simultaneously embossed to satisfactorily emboss a part ranging from the dried coating film face to the backside of the support. It was confirmed that the concave and convex shape was satisfactorily provided in a part ranging from the coating face to the backside of the paper.

For a particular part (3 mm×3 mm) in this emboss roll, irregularities (concaves and convexes) were measured with a three-dimensional surface roughness tester (Surfcom 590A, manufactured by Tokyo Seimitsu Co., Ltd.). As a result, the average height from center plane (Ra) was 16.1 μm, and the ten-point mean roughness (Rz) was 64.4 μm.

The assembly was then irradiated with ultraviolet light from a high-pressure mercury lamp (output 120 W/cm) at 600 mj/cm² to cure the heat cured ionizing radiation curable composition film. Thus, an embossed release paper was prepared. The separability of the release paper, thus obtained, when repeatedly used was measured. The results were as shown in Table 5.

The separability was evaluated by preparing an ester-type polyurethane resin composition having a formulation specified in table 3, coating the composition onto the release paper prepared in the Experiment Example with a knife coater to a thickness of 20 μm on a dry basis, drying the coating by hot air at 160° C. for one min to form a polyurethane skin layer, coating a two-component curable polyester-type polyurethane adhesive specified in Table 4 onto the polyurethane skin layer with a knife coater to a thickness of 40 μm on a dry basis to form an adhesive layer, laminating a backing fabric to the assembly, drying the laminate by hot air at 130° C. for 5 min, and further aging the dried laminate at 40° C. for 48 hr to allow the adhesive to cure through a reaction, and then measuring the peel strength (15 mm-width) between the release paper and the polyurethane skin layer.

TABLE 3

Ester-type polyurethane resin composition

| | |
|---|---|
| Ester-type polyurethane (Crisvon NB-637N, manufactured by Dainippon Ink and Chemicals, Inc.) | 100 parts by mass |

TABLE 3-continued

Ester-type polyurethane resin composition

| | |
|---|---|
| Color (Dilac TV-COLOR, manufactured by Dainippon Ink and Chemicals, Inc.) | 15 parts by mass |
| Methyl ethyl ketone | 20 parts by mass |
| Dimethylformamide | 10 parts by mass |

TABLE 4

Polyester-type polyurethane adhesive

| | |
|---|---|
| Main agent: two-component curable ester-type polyurethane resin (Crisvon 4070, manufactured by Dainippon Ink and Chemicals, Inc.) | 100 parts by mass |
| Curing agent: curing agent for two-component curable urethane resin (Crisvon NX, manufactured by Dainippon Ink and Chemicals, Inc.) | 13 parts by mass |
| Accelerating agent: curing accelerating agent for two-component curable urethane resin (Crisvon Accel HM, manufactured by Dainippon Ink and Chemicals, Inc.) | 3 parts by mass |
| Solvent: methyl ethyl ketone | 30 parts by mass |

Experiment Examples 2 to 10

An embossed release paper was prepared in the same manner as in Experiment Example 1, except that (meth)acryloyl group-containing acrylic copolymers produced in Synthesis Examples 3 to 9 and Synthesis Example 13 were used instead of the (meth)acryloyl group-containing acrylic copolymer produced in Synthesis Example 2. The separability with repeated use was measured in the same manner as in Experiment Example 1. The results are shown in Table 5.

TABLE 5

Separability

| | | Change in separability with repeated use (gf/15 mm-width) | | | | |
|---|---|---|---|---|---|---|
| | | 1st | 2nd | 5th | 7th | 10th |
| Experiment Example 1 | Synthesis Example 1 | 22 | 24 | 17 | 15 | 16 |
| Experiment Example 2 | Synthesis Example 2 | 20 | 24 | 28 | 35 | 32 |
| Experiment Example 3 | Synthesis Example 3 | 18 | 18 | 19 | 15 | 23 |
| Experiment Example 4 | Synthesis Example 4 | 17 | 19 | 18 | 15 | 18 |
| Experiment Example 5 | Synthesis Example 5 | 27 | 28 | 26 | 29 | 33 |
| Experiment Example 6 | Synthesis Example 6 | 25 | 26 | 29 | 33 | 31 |
| Experiment Example 7 | Synthesis Example 7 | 21 | 30 | 33 | 38 | 28 |
| Experiment Example 8 | Synthesis Example 8 | 37 | 40 | 54 | 45 | 55 |
| Experiment Example 9 | Synthesis Example 9 | 24 | 36 | 32 | 37 | 37 |
| Experiment Example 10 | Synthesis Example 13 | 37 | 39 | 54 | 31 | 44 |

Experiment Example 11

The embossed release paper produced in Experiment Example 1 was provided as an embossed release paper (100). As shown in FIG. 9, four sheets of a melamine resin-impregnated core paper (320) were superimposed on a backing paper (310) (neutralized paper; basis weight 130 g/m$^2$). A melamine resin-impregnated decorative paper (330) and a melamine resin-impregnated overlay paper (340) were superimposed in that order on the laminate, and the embossed release paper (100) was superimposed thereon so that the embossed and heat cured silicone surface (10) came into contact with the overlay paper (340). The assembly was held between two planished metal plates (400A, 400B). The temperature was raised from room temperature to 150° C. under a pressure of 100 kg/cm$^2$ over a period of 5 min, was held at 150° C. for 7 min, and was fallen from 150° C. to room temperature over a period of 7 min. The pressing caused the melamine resin, which had leached out from the overlay paper (340) and the melamine resin-impregnated decorative paper (330), to cure to form a melamine resin layer, and the melamine resin layer had a concave and convex pattern formed by the embossed release paper (100).

<Results>

The (meth)acryloyl group-containing acrylic copolymer produced in Synthesis Example 12 had a Tg value of 35° C. and caused excessive softening, and, consequently, an embossed release paper could not be produced.

All of the release papers produced in Experiment Examples 1 to 10, even after a peel test in which each of the release papers was repeatedly used ten times, had a peel strength of 60 gf/15 mm-width and could be effectively used. In particular, as shown in Experiment Example 10, even the specific (meth)acryloyl group-containing acrylic copolymer having a Tg value of 122° C., after the peel test in which each of the release papers was repeatedly used ten times, could be effectively used as the release paper.

As shown in Experiment Examples 7 and 8, the (meth)acryloyl group-containing acrylic copolymers produced in Synthesis Examples 7 and 8 were identical to each other in composition, Tg, and double bond equivalent and were different from each other in weight average molecular weight and number average molecular weight. Even when the weight average molecular weight was reduced from 39000 to 18000, as shown in Experiment Examples 7 and 8, both the copolymers could be effectively used as the embossed release paper.

As shown in Experiment Example 11, even in a production process in which high temperature and high pressure conditions are applied, for example, in the production of melamine decorative sheets, the embossed release papers according to the present invention can satisfactorily form embosses on the surface of melamine decorative sheets.

The invention claimed is:

1. A embossed release paper comprising a paper base material, an ionizing radiation-cured resin layer, and a heat-cured silicone layer stacked in that order, the embossed release paper having embosses, the ionizing radiation-cured resin layer being formed by curing an ionizing radiation-curable composition selected from the group consisting of a (meth)acryloyl group-containing acrylic copolymer (I) and (II), wherein the (meth)acryloyl group-containing acrylic copolymer (I) is a copolymer produced by reacting an epoxy group-containing copolymer (C) comprising (meth)acrylate monomer units (A) and epoxy group-containing (meth)acrylate monomer units (B) with (meth)acrylic acid, and the (meth)acryloyl group-containing acrylic copolymer (II) is a copolymer produced by reacting a copolymer comprising 35 to 80 parts by mass of a (meth)acrylic ester, 20 to 60 parts by mass of a glycidyl (meth)acrylic ester, and 0 to 30 parts by mass of another (meth)acrylic ester with 10 to 30 parts by mass of a (meth)acrylic acid.

2. The embossed release paper according to claim 1, which further comprises an intermediate layer provided between the paper base material and the ionizing radiation-cured resin layer.

3. The embossed release paper according to claim 1, wherein the ionizing radiation-cured film has been formed by curing an ionizing radiation-curable composition formed of an (meth)acryloyl group-containing acrylic copolymer (I) having a weight average molecular weight (Mw) of 5,000 to 200,000, a variance ratio (Mw/Mn) of 1.0 to 5.0, and a glass transition temperature (Tg) of 40 to 150° C. by ionizing radiation irradiation.

4. The embossed release paper according to claim 1, wherein the acrylic copolymer has a double bond equivalent of 0.5 to 4.5.

5. The embossed release paper according to claim 1, wherein the ionizing radiation-cured film contains 0.5 to 50% by mass of an inorganic pigment.

6. The embossed release paper according to claim 2, wherein the intermediate layer is formed of a thermoplastic resin.

7. The embossed release paper according to claim 1, wherein the heat-cured silicone layer has been formed by heat curing a heat-curable silicone composition comprising an alkenyl group-containing organopolysiloxane, an organohydrogenpolysiloxane, and a platinum-based curing catalyst.

8. The embossed release paper according to claim 1, wherein the emboss has a concave and convex shape comprising a concave part and a convex part, and a fine concave and convex shape which is finer than the concave and convex shape is provided on the convex part.

9. The embossed release paper according to claim 1, for use in the production of synthetic leathers which is obtained by coating a resin composition onto the heat-cured silicone layer in the embossed release paper to laminate a backing fabric onto the resin composition, and then drying the resin composition to separate the embossed release paper from the resin composition.

10. The embossed release paper according to claim 1, for use in the production of melamine decorative sheets which is obtained by superimposing a melamine resin layer on the heat-cured silicone layer in the embossed release paper to form an assembly, then heating and pressing the assembly, and then separating the embossed release paper from the assembly.

11. A process for producing an embossed release paper according to claim 1, the process comprising:
- stacking a thermoplastic resin onto a paper base material;
- then surface-treating the thermoplastic resin to form a surface treated layer;
- stacking an ionizing radiation-curable composition and a heat-curable silicone composition onto the surface treated layer to prepare a laminate;
- embossing the laminate; and
- then subjecting the embossed laminate to ionizing radiation curing treatment.

* * * * *